(12) United States Patent
May

(10) Patent No.: US 9,803,634 B2
(45) Date of Patent: Oct. 31, 2017

(54) VALVE PLATE ARRANGEMENT FOR AN AXIAL PISTON PUMP

(71) Applicant: Caterpillar Inc., Peoria, IL (US)

(72) Inventor: Michael P. May, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 410 days.

(21) Appl. No.: 14/478,180

(22) Filed: Sep. 5, 2014

(65) Prior Publication Data

US 2016/0069342 A1   Mar. 10, 2016

(51) Int. Cl.
| F04B 49/22 | (2006.01) |
| F04B 1/12 | (2006.01) |
| F04B 1/14 | (2006.01) |
| F04B 1/29 | (2006.01) |
| F04B 53/10 | (2006.01) |
| F16K 3/02 | (2006.01) |
| F16K 3/08 | (2006.01) |
| F16K 3/316 | (2006.01) |
| F16K 3/34 | (2006.01) |
| F04B 1/30 | (2006.01) |
| F04B 1/20 | (2006.01) |

(52) U.S. Cl.
CPC ............ *F04B 49/225* (2013.01); *F04B 1/124* (2013.01); *F04B 1/143* (2013.01); *F04B 1/145* (2013.01); *F04B 1/148* (2013.01); *F04B 1/2042* (2013.01); *F04B 1/295* (2013.01); *F04B 1/303* (2013.01); *F04B 53/10* (2013.01); *F16K 3/029* (2013.01); *F16K 3/085* (2013.01); *F16K 3/316* (2013.01); *F16K 3/34* (2013.01); *Y10T 137/86743* (2015.04)

(58) Field of Classification Search
CPC .. F04B 1/12; F04B 1/122; F04B 1/124; F04B 1/20; F04B 1/2035; F04B 1/2042; F04B 1/2078; F04B 1/26; F04B 1/30; F04B 1/303; F04B 1/306; F04B 1/32; F04B 1/324; F04B 1/143; F04B 1/145; F04B 1/148; F04B 1/295; F04B 49/225; F04B 53/10; Y10T 137/86743; F16K 3/029; F16K 3/085; F16K 3/34; F16K 3/316
USPC ............ 251/208, 286, 287; 91/505; 417/270
See application file for complete search history.

(56) References Cited

U.S. PATENT DOCUMENTS

| 4,449,444 A | * | 5/1984 | Forster ...................... F04B 1/22 |
| | | | 417/222.1 |
| 5,593,285 A | | 1/1997 | Watts |
| 6,196,109 B1 | * | 3/2001 | Zumbusch ............ F04B 1/2042 |
| | | | 91/6.5 |
| 6,238,315 B1 | | 5/2001 | Morse et al. |

(Continued)

*Primary Examiner* — Theodore Stigell
*Assistant Examiner* — Chirag Jariwala

(57) ABSTRACT

An axial piston pump may comprise a valve plate assembly including a plurality of valve plates rotatably disposed adjacent to each other and configured to control the flow of fluid between a piston chamber and inlet and outlet port passages. The piston pump may also comprise a swashplate arrangement that is capable of being angled in two different directions to be used in combination with the valve plate assembly. A fixed displacement axial piston pump may also comprise the valve plate assembly disclosed herein in which pressure transitions are facilitated in the same fashion, but without the variable of changing swashplate angles which control pump flow.

8 Claims, 17 Drawing Sheets

(56) References Cited

U.S. PATENT DOCUMENTS

| | | | |
|---|---|---|---|
| 6,655,255 B2 * | 12/2003 | May | F04B 1/324 |
| | | | 91/506 |
| 7,318,709 B2 | 1/2008 | Koelzer et al. | |
| 8,210,205 B2 * | 7/2012 | Michaels | F16K 11/087 |
| | | | 137/625.43 |
| 2009/0084258 A1 * | 4/2009 | Stoelzer | F04B 1/16 |
| | | | 91/505 |
| 2013/0118346 A1 * | 5/2013 | MacHarg | F04B 1/146 |
| | | | 92/57 |

* cited by examiner

VALVE PLATE ARRANGEMENT FOR AN AXIAL PISTON PUMP

TECHNICAL FIELD

This disclosure relates generally to an axial piston pump and more specifically to a valve plate arrangement for an axial piston pump.

BACKGROUND

Variable displacement axial piston pumps typically include a barrel having a plurality of piston assemblies slideably disposed in respective bores within the barrel and a swashplate that is in mating contact with the piston assemblies so that the piston assemblies are forced to reciprocate within the bores of the barrel to receive fluid therein and discharge fluid therefrom. The swashplate is secured to the housing of the pump and is selectively pivotable relative to the barrel so that the volume of fluid being discharged therefrom may be controlled. There have been many attempts to control the pressure transition between the point at which all of the fluid has been discharged from the respective bores and the point at which the respective bores are opened to receive more fluid. Likewise, there have been many attempts to control the pressure transition between the point at which the respective bores are full and the point at which respective bores are opened to discharge fluid. In most of these attempts, special slots or holes are provided to controllably interconnect the high pressure side of the pump to the low pressure side and vice-versa to make the pressure transition as smooth as possible. Even with the special slots or holes, energy is wasted during the respective pressure transitions.

As an example, U.S. Pat. No. 5,593,285 describes a pair of valve plates stacked together in a fixed manner to function as a single valve plate. The valve plate assembly defines a restricted flow path for providing initial fluid pressure communication between an approaching piston bore of the rotatable barrel and an inlet port and a discharge port which extends through the pair of plates to equalize the pressure in the piston chamber with the pressure in the inlet or discharge port. However, an axial piston pump using a conventional slotted valve plate, or multiple valve plates in fixed configuration, suffers from a problem of uncontrolled compression and expansion of hydraulic fluid inside the piston chamber as the barrel rotates through the pressure transitions at top dead center (TDC) and bottom dead center (BDC). These uncontrolled pressure transitions occurring within the piston chamber result in a power efficiency loss for the pump and may also increase the noise and vibration of the pump as well.

Furthermore, FIG. 1 illustrates the porting of a conventional valve plate which utilizes slots at TDC and BDC to facilitate the pressure transition of the fluid within the piston chamber as the piston passes from the high to the low pressure side of the pump. Such slots are known to result in an overall power loss in the pump operation due to the uncontrolled compression or expansion of the fluid within the piston chamber to achieve equilibrium as the piston chamber transitions from the low side to the high side of the pump, and vice versa.

The disclosure addresses these and other shortcomings of the prior art.

SUMMARY

In one aspect, the disclosure describes a variable displacement axial piston pump adapted for use in a fluid system. The variable displacement axial piston pump may include a housing having a body portion and a head portion with an inlet port passage and an outlet port passage. A rotating group may be disposed in the body portion and having an axis of rotation and including a barrel having a plurality of cylinder bores, a plurality of piston assemblies with each of the plurality of piston assemblies having a piston slideably disposed within one of the cylinder bores and a shoe pivotably attached to and extending from the piston, the rotating group being in fluid communication with the inlet and outlet port passages of the head portion. A valve plate assembly may be disposed between the head portion of the housing and the rotating group, the valve plate assembly comprising a plurality of plates rotatably disposed adjacent each other and configured to control a flow of fluid between the rotating group and one or more of the inlet and outlet port passages of the head portion. A swashplate arrangement may be disposed in the body portion and being pivotable in a first arcuate direction relative to an axis of rotation of the barrel rotating group and pivotable in a second arcuate direction relative to the axis of rotation of the barrel rotating group.

In another aspect, the disclosure describes a valve plate assembly including a first valve plate comprising one or more slots configured to receive a flow of fluid, a locating pin coupled to the first valve plate, a second valve plate slideably disposed adjacent the first valve plate, the second valve plate comprising an aperture configured to receive the locating pin and one or more slots configured to at least partially align with the one or more slots of the first valve plate, and a third valve plate slideably disposed adjacent the second valve plate, the third valve plate comprising an aperture configured to receive the locating pin and one or more slots configured to at least partially align with the one or more slots of the first valve plate. The second valve plate and the third valve plate may be configured to independently rotate relative to the first valve plate. The location pin may limit a rotation of one or more of the second valve plate and the third valve plate.

In yet another aspect, the disclosure describes a method of operating an axial piston pump comprising a swashplate, a valve plate assembly comprising a plurality of plates, and a group of piston assemblies disposed between the swashplate and the valve plate assembly. One method may comprise adjusting a position of a swashplate arrangement in at least one direction to displace one or more of a top dead center and a bottom dead center of the group of piston assemblies, slideably rotating one or more of the plurality of plates of the valve plate assembly relative to another plate of the plurality of plates to control an amount of trapped fluid volume effected by the valve plate assembly, and rotating the group of piston assemblies.

DETAILED DESCRIPTION

In an aspect, an axial piston pump may comprise a valve plate assembly including a plurality of valve plates rotatably disposed adjacent to each other and configured to control the flow of fluid between a piston chamber and the inlet and outlet port passages. Rotational movement of one or more of the plurality of plates relative to each other may provide control over the amount of valve plate trap provided in the pump at top dead center (TDC) and bottom dead center (BDC) for controlling the pressure transitions within the piston chamber as it passes over the BDC and TDC positions within the pump.

In another aspect, a variable displacement axial piston pump may also comprise a swashplate arrangement that is capable of being angled in two different directions to be used in combination with the valve plate assembly to deliver a high capacity axial piston pump which will enable the perfect pressure transitions of the fluid in the piston chamber as it passes over BDC and TDC in the pump. The two-degree-of-freedom swashplate in the combined application may serve as a power booster to the valve plate assembly which would enable the perfect fluid pressure transitions to occur in the pump beyond the capacity designed into the valve plate assembly.

In a further aspect, a fixed displacement axial piston pump may comprise the valve plate assembly disclosed herein in which pressure transitions are facilitated in the same fashion, but without the variable of changing swashplate angles which control pump flow. The advantages to the valve plate arrangement in these, and any other perceived fluid applications, may include improved pump efficiency and reduced noise and vibration within the pump.

Figure 1:
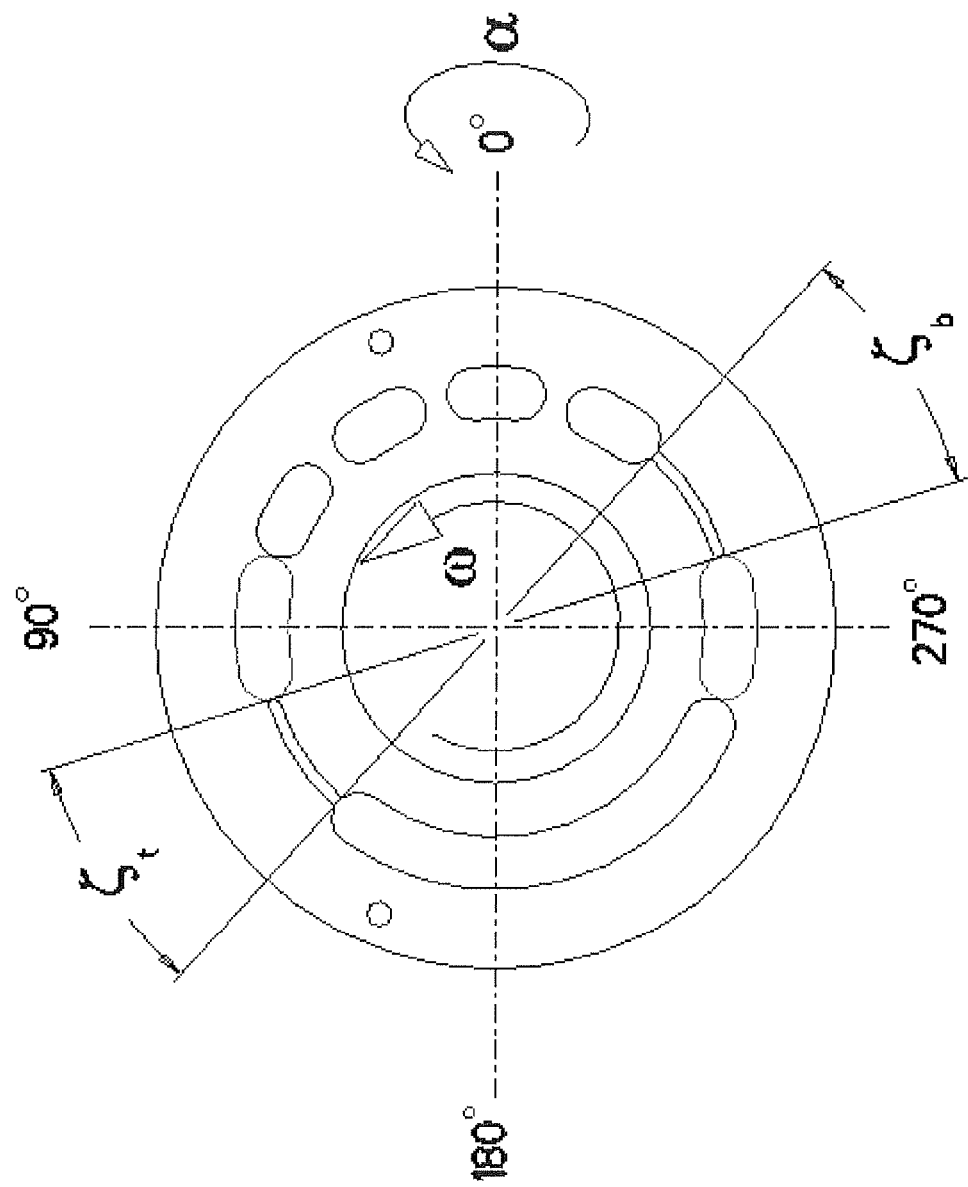
FIG. 1 is a diagrammatic representation of porting of a fluid within a fluid pump of the prior art.
Figure 2:
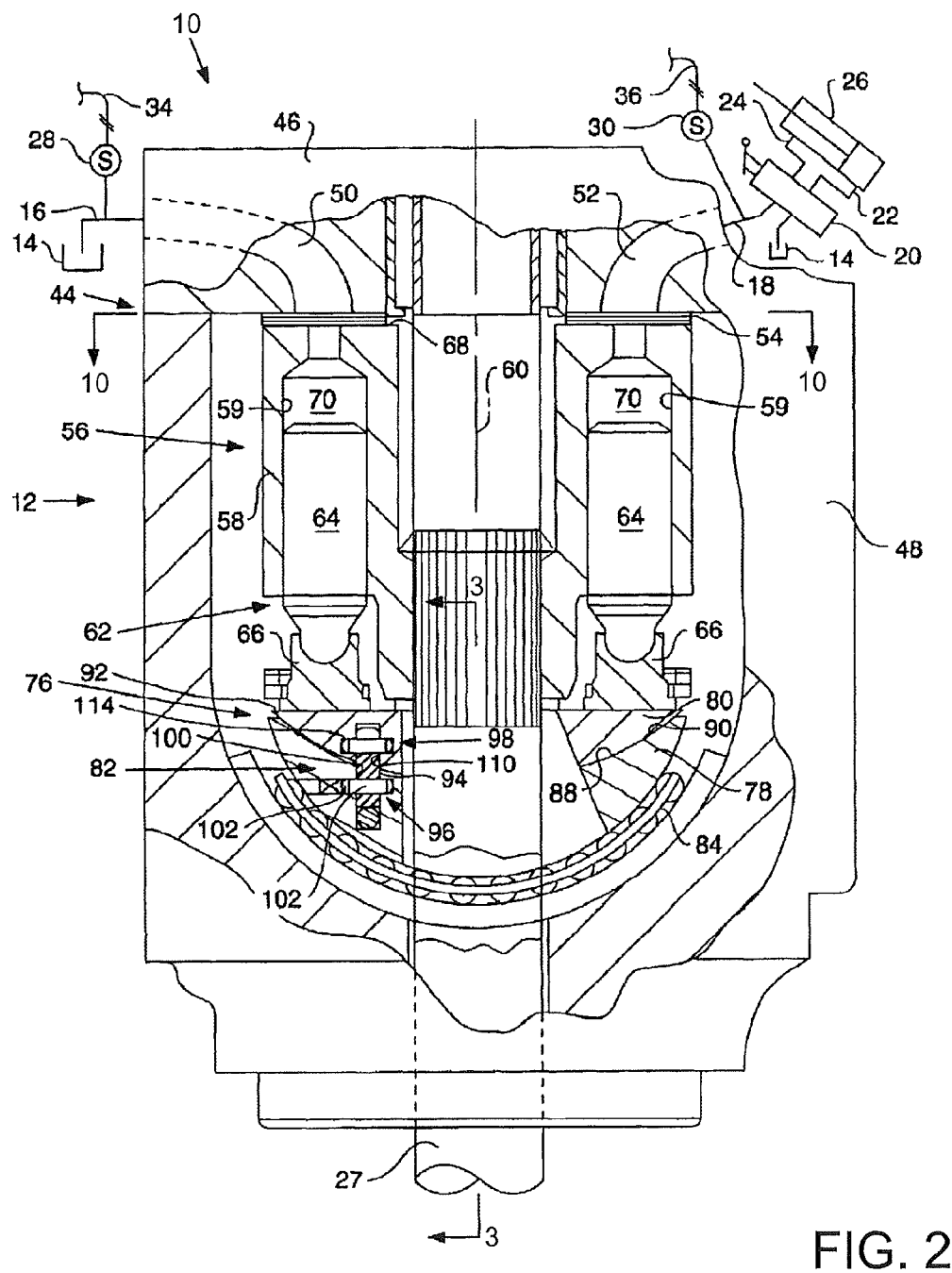
FIG. 2 is a partial schematic and partial diagrammatic representation of a fluid pump and a fluid system in accordance with aspects of the disclosure.
Figure 3:
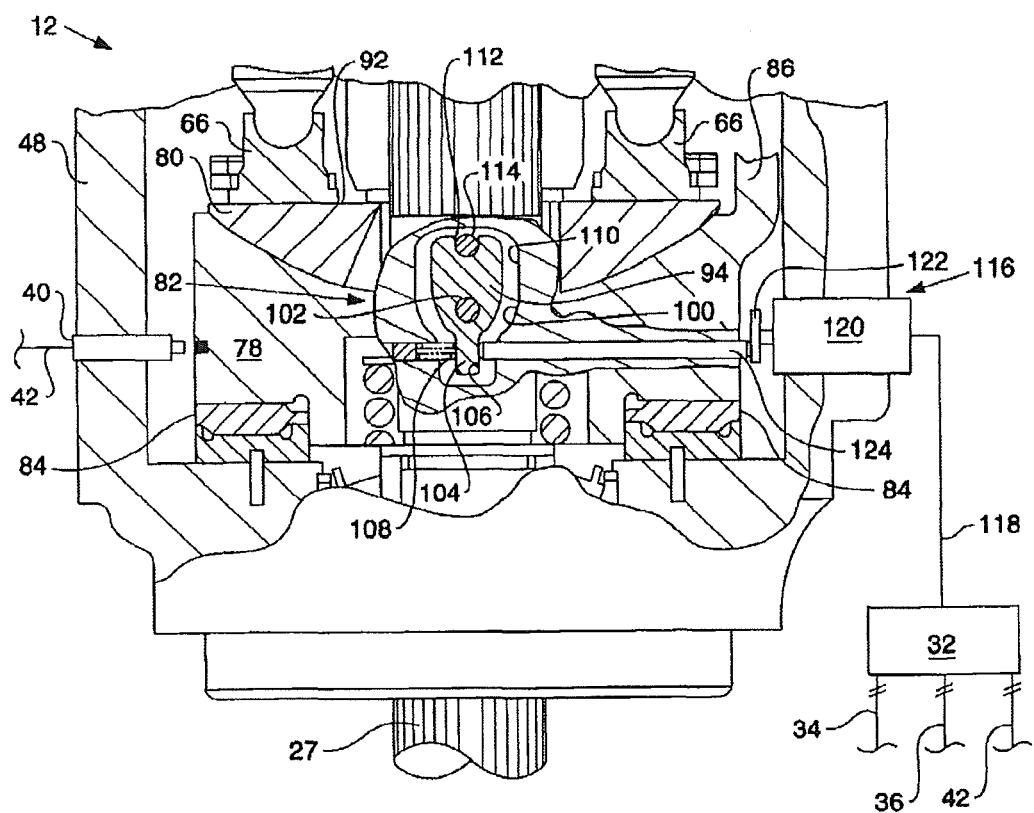
FIG. 3 is a partial schematic and partial diagrammatic representation of a section 3-3 taken from FIG. 2.

Now Referring to the drawings and more particularly to FIGS. 2 and 3, a fluid system 10 is illustrated that may include a variable displacement axial piston pump 12 that may receive fluid from a tank 14 via a conduit 16. The variable displacement axial piston pump 12 may deliver pressurized fluid via a supply conduit 18 to a fluid control valve 20 and selectively through work conduits 22, 24 to a fluid actuator 26. In the subject arrangement, the variable displacement axial piston pump 12 may be a unidirectional pump that rotates in a counterclockwise direction as driven by a power input shaft 27. However, other configurations may be used including variable rotation direction and variable direction fluid flow.

In an aspect, the fluid system 10 may include first and second pressure sensors 28, 30. The first and second pressure sensors 28, 30 may respectively be connected to the tank conduit 16 and the supply conduit 18. As an example, the pressure sensors 28, 30 may be operative to sense the pressure in the respective lines and deliver an electrical signal to a controller 32 through electrical lines 34, 36. A position sensor 40 may be mounted on the variable displacement axial piston pump 12 and operative to sense the displacement of the pump and deliver a signal representative thereof to the controller 32 via an electrical line 42.

Various other components may be used in the subject fluid system 10 without departing from the essence of the subject disclosure. For example, several control valves 20 and associated fluid actuators 26 could be used. Likewise, other sensors of various types and styles could be used.

The variable displacement axial piston pump 12 may include a housing 44 having a head portion 46 and a body portion 48. The head portion 46 may define an inlet port passage 50 that is connected to the conduit 16 and an outlet port passage 52 that is connected to the supply conduit 18. In the subject arrangement, a valve plate assembly 54 is disposed between the head portion 46 and the body portion 48. In an aspect, the valve plate assembly 54 includes a plurality of valve plates 54a, 54b, 54c (FIGS. 6-9) rotatably disposed adjacent each other. The construction of the porting within the valve plate assembly 54 is more clearly illustrated in FIGS. 6-9 and will be discussed more fully below. It is recognized that the porting illustrated in FIG. 6-9 could be made within the head portion 46 without departing from the essence of the subject disclosure.

Referring again to FIGS. 2 and 3, a rotating group 56 may be disposed within the body portion 48. Other configuration may be used. The rotating group 56 may include a barrel 58 having a plurality of cylinder bores 59 defined therein spaced from one another around an axis of rotation 60 of the rotating group 56. As an example, each of the cylinder bores 59 may be oriented within the barrel 58 parallel with the axis of rotation 60. A plurality of piston assemblies 62 may be operatively associated with the barrel 58. One or more of the plurality of piston assemblies 62 may include a piston 64 slideably disposed in one or more of the plurality of cylinder bores 59. One or more of the plurality of piston assemblies 62 may have a shoe 66 pivotably coupled to one end of each piston 64 in a conventional manner.

The barrel 58 may have an end surface 68 configured to mate and/or form a sealing contact with the valve plate assembly 54 to provide communication between the cylinder bores 59 and the respective inlet and outlet port passages 50, 52 of the head portion 46. A closed piston chamber 70 may be defined in each cylinder bore 59 of the barrel 58 between the end of the piston 64 and the end surface 68 thereof.

A swashplate arrangement 76 may be pivotably disposed within the body portion 48. As viewed in FIG. 2, the swashplate arrangement 76 may be pivoted in a first direction (e.g., arcuate, clockwise direction) relative to the axis of rotation 60 of the rotating group 56. The swashplate arrangement 76 of the subject aspect may include a primary member 78, a secondary member 80, and an actuating mechanism 82.

The primary member 78 may be mounted within the body portion 48 on a pair of arcuate bearing assemblies 84 in a known manner. An operating lever 86 may extend from the primary member 78 and may be operative in response to an external command (not shown) to change the angular position of the primary member 78 relative to the axis of rotation of the rotating group 56. As an example, the primary member 78 may have a concave spherical surface 88 on one side thereof between the pair of bearing assemblies 84. Other shapes and configurations of the swashplate arrangement 76 may be used.

The secondary member 80 may be pivotably disposed on the primary member 78. As an example, secondary member 80 may have a convex spherical surface 90 on one side thereof that is of a size and shape sufficient to mate with the concave spherical surface 88 of the primary member 78. Other shapes and configurations of the swashplate arrangement 76 may be used. As viewed in FIG. 3, the secondary member 80 may rotate in a counterclockwise direction. As an example, the pivot direction of the secondary member 80 may be oriented at an angle about the axis of rotation 60 of the rotating group 56 relative to the pivot direction of the primary member 78 and could be in the range of 80 to 90 degrees. In the subject aspect, the angle is at 90 degrees. A flat surface 92 may be disposed on the other side of the secondary member 80 and may be configured to mate, in a well-known sliding relationship, with the respective shoes 66 of the plurality of piston assemblies 62 of the rotating group 56.

In FIG. 3, the actuating mechanism 82 is shown broken out from the sectional view. As can be understood from FIG. 2, the actuating mechanism 82, when viewed in FIG. 3, would be located behind the power input shaft 27. In order to more clearly illustrate the actuating mechanism 82, it is being shown as a broken out portion. The actuating mechanism 82 may include a link 94 having a first portion 96 and a second portion 98. The first portion 96 may be disposed in a slot 100 of the primary member 78 and rotated about a pin 102 disposed thereacross. The first portion 96 may include a lever arm 104 at the end thereof away from the second portion 98. An abutment shoulder 106 may be disposed within the slot 100 at the bottom thereof and the lever arm 104 may be in operative contact with the abutment shoulder 106. A biasing member 108, such as a spring, may be disposed in the slot 100 and may be operative to bias the lever arm 104 against the abutment shoulder 106 thus holding the secondary member 80 in its "0" angular position relative to the primary member 78.

The second portion 98 of the link 94 may extend into a slot 110 defined within the secondary member 80. A slot 112 may be defined at the end of the second portion 98 and a reaction member 114 may be disposed across the slot 110 of the secondary member 80 and through the slot 112 of the second portion 98 of the link 94.

A remotely controlled actuating mechanism 116 may be mounted on the body portion 48 and may be connected to the controller 32 via a signal line 118. The actuating mechanism 116 may include an actuator 120 having an output member 122 in continuous operative contact with a force member 124 that may be disposed within the primary member 78 and may be in contact with the lever arm 104 of the link 94 and may act against the bias of the biasing member 108.

Figure 4:
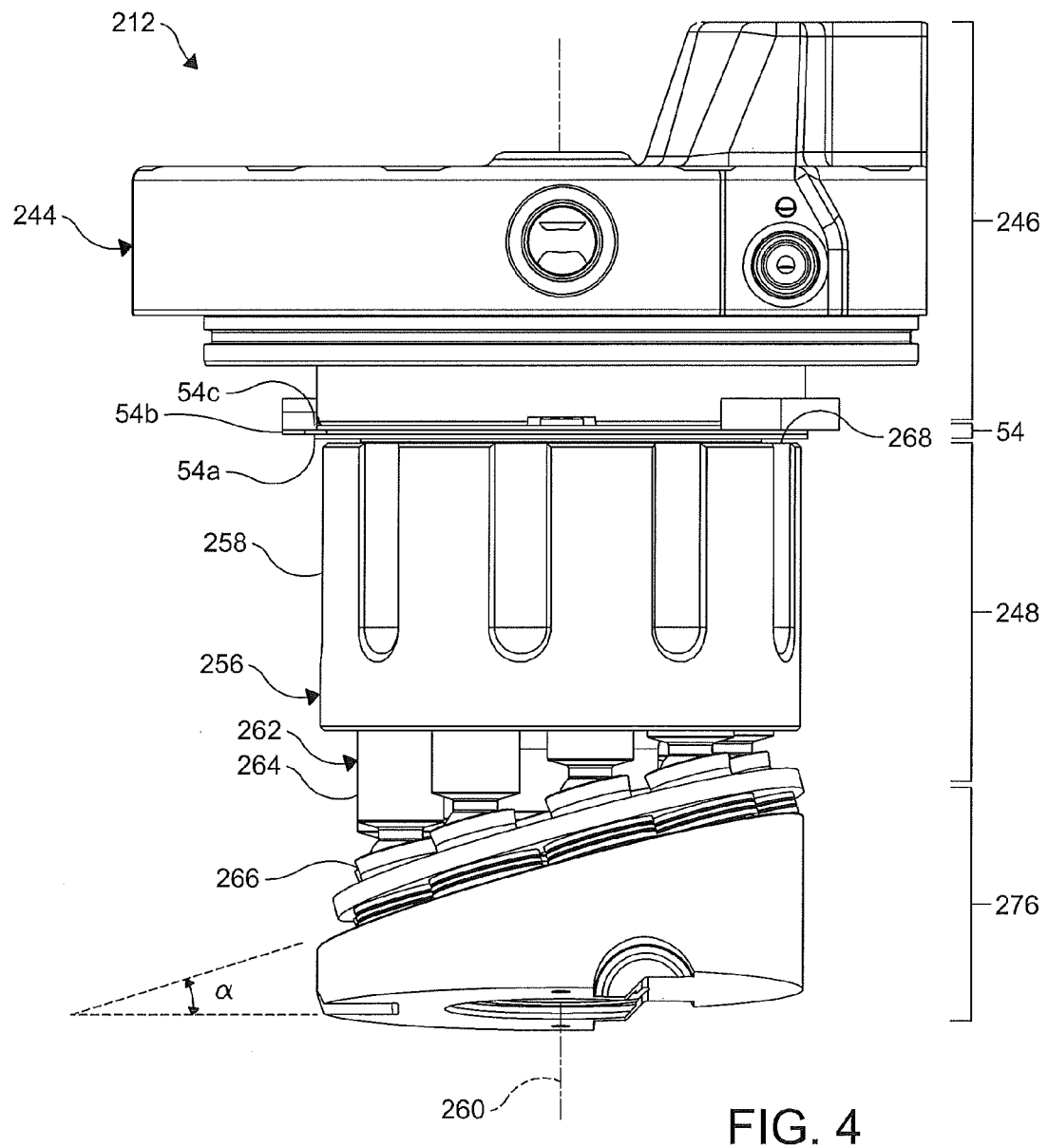
FIG. 4 is a side elevation view of a fluid pump system according to aspects of the disclosure.
Figure 5:
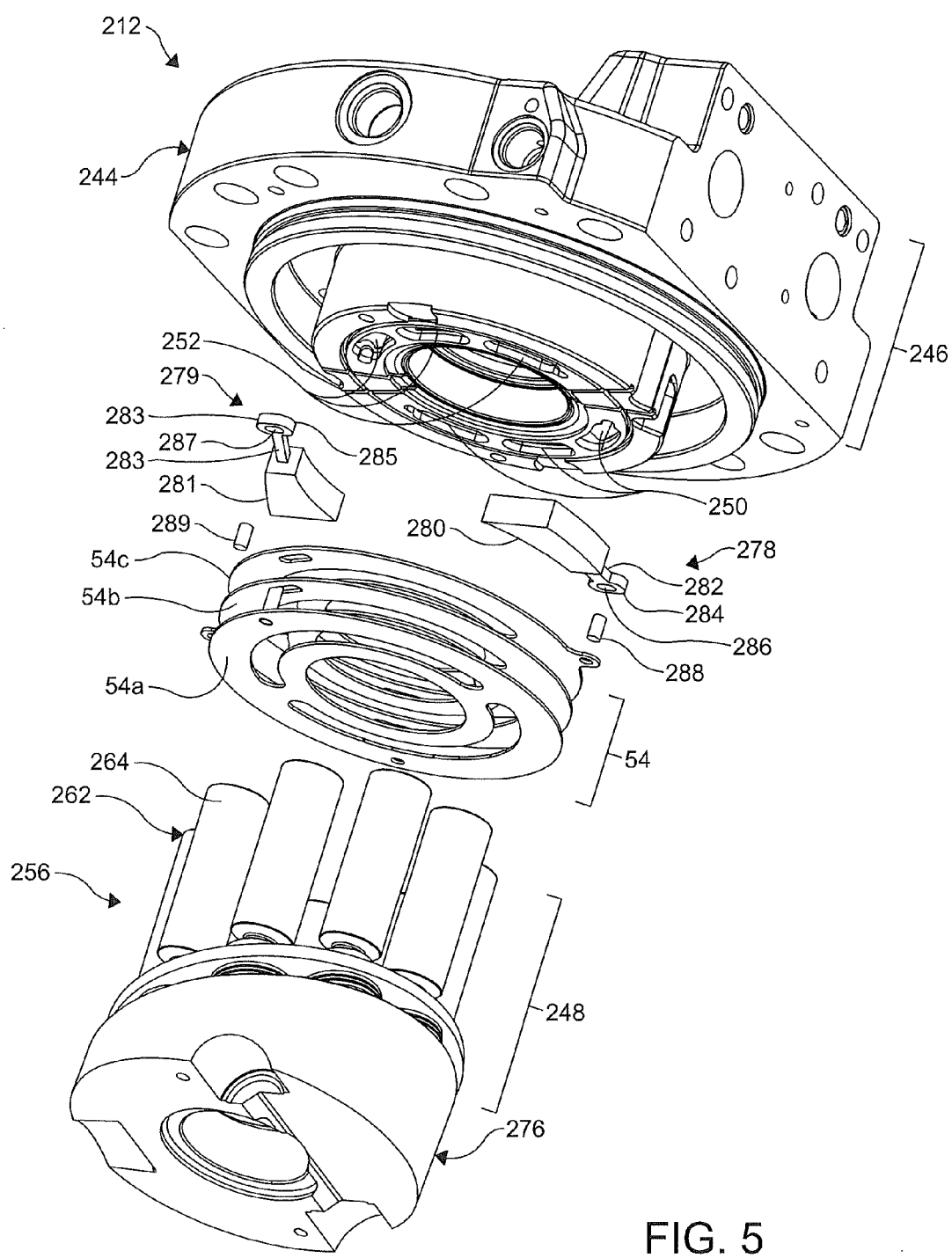
FIG. 5 is an exploded perspective view of the fluid pump system of FIG. 4.
Figure 6:
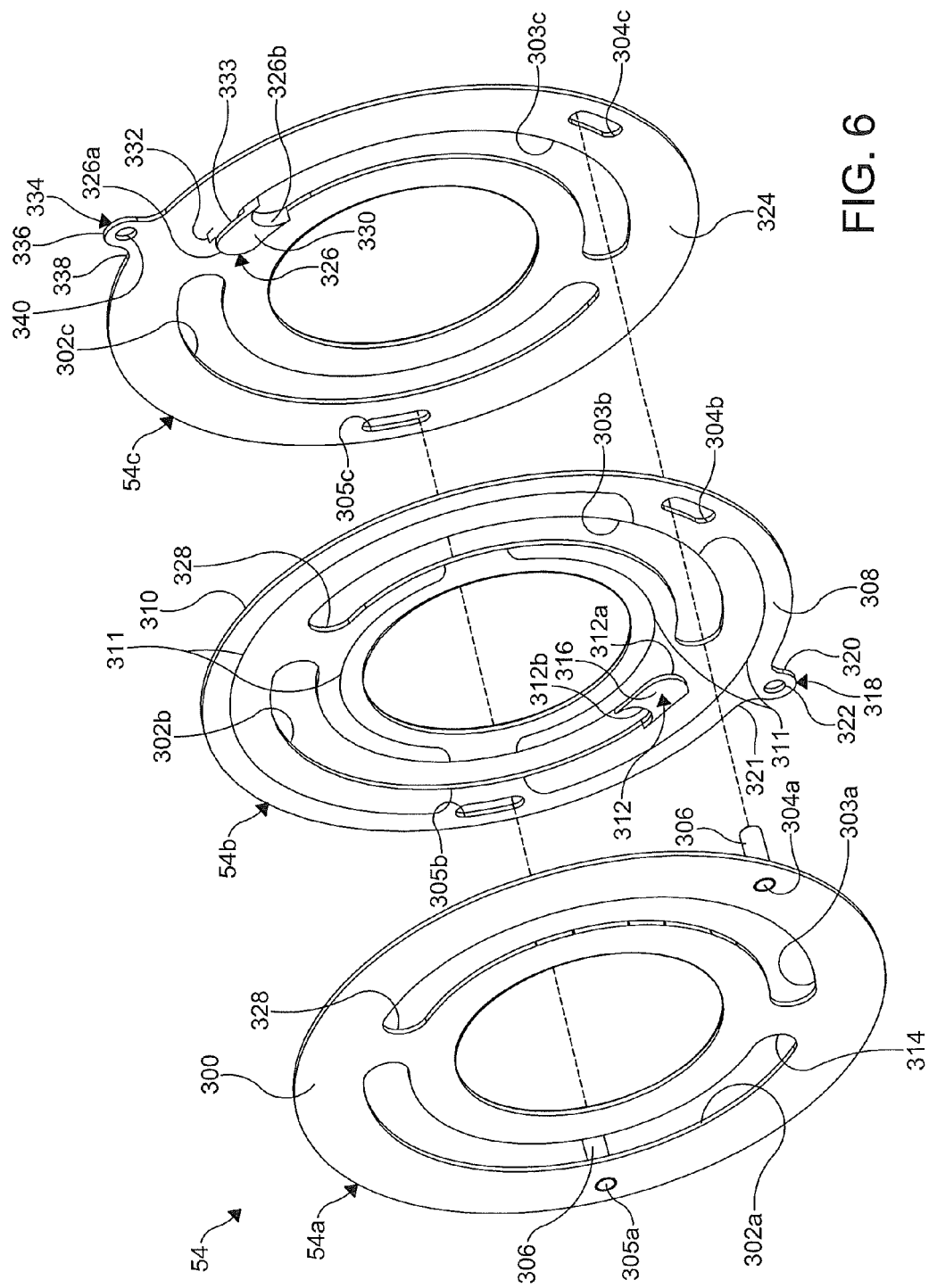
FIG. 6 is an exploded perspective view of a valve plate assembly according to aspects of the disclosure.

FIGS. 4-5 illustrate a variable displacement axial piston pump 212 according to another aspect of the disclosure. The variable displacement axial piston pump 212 may be similar to the variable displacement axial piston pump 12 shown in FIGS. 2-3, except as differentiated below. Other configurations of the variable displacement axial piston pumps 12, 212 may be used. As shown, the variable displacement axial piston pump 212 may include a housing 244 having a head portion 246 and a body portion 248. The head portion 246 may define an inlet port passage 250 and an outlet port passage 252. In the subject arrangement, the valve plate assembly 54 is disposed between the head portion 246 and the body portion 248. In an aspect, the valve plate assembly 54 includes the plurality of valve plates 54a, 54b, 54c (FIGS. 6-9) rotatably disposed adjacent each other. As shown, the same valve plate assembly 54 may be used with numerous variable displacement axial piston pumps such as variable displacement axial piston pumps 12, 212 and fixed displacement axial piston pumps. The valve plate assembly 54 may also be used with other fluid devices.

A rotating group 256 may define a portion of the body portion 248 or may be disposed within the body portion 248. The rotating group 256 may include a barrel 258 having a plurality of cylinder bores (not shown) defined therein and spaced (e.g., equally) from one another around an axis of rotation 260 of the rotating group 256. Each of the cylinder bores is oriented within the barrel 258 parallel with the axis of rotation 260. However, other cylinder bore orientations may be used. A plurality of piston assemblies 262 may be operatively associated with the barrel 258. One or more of the plurality of piston assemblies 262 may include a piston 264 slideably disposed in the respective plurality of cylinder bores. One or more of the plurality of piston assemblies 262 may have a shoe 266 pivotably attached to one end of the respective piston 264 in a conventional manner.

The barrel 258 may have an end surface 268 configured to mate and/or form a sealing contact with the valve plate assembly 54 to provide fluid communication between the cylinder bores and the respective inlet and outlet port passages 250, 252 of the head portion 246.

A swashplate arrangement 276 is pivotably disposed adjacent the rotating group 256. In an aspect, the swashplate arrangement 276 may be pivoted in a first direction (e.g., first degree of freedom, arcuate clockwise direction, etc.) relative to the axis of rotation 260 of the rotating group 256. An angle of pivot "α" in the first direction can be measured from a horizontal plane representing 0° (See also FIG. 11). As shown in FIG. 4, α is greater than 0. The swashplate arrangement 276 may also be pivoted in a second direction (e.g., second degree of freedom) relative to the axis of rotation 260 of the rotating group 256. The second direction may be different from the first direction and may shift the position of top dead center and bottom dead center of pistons within the rotating group 256. An angle of pivot "β" in second direction can be measured from a horizontal plane representing 0° (See FIG. 12).

In an aspect, the valve plate assembly 54 may include a plurality of valve plates 54a, 54b, 54c (FIGS. 6-9) rotatably disposed adjacent each other. As an example, one or more actuator assemblies 278, 279 may be configured to engage at least a portion of the valve plate assembly 54. Each of the actuator assemblies 278, 279 may include an actuator body 280, 281 configured to control articulation of an actuator rod 282, 283. The actuator bodies 280, 281 may be coupled to the head portion 246 or an inside wall of the housing 244 or other portion of the variable displacement axial piston pump 212. The actuator rods 282, 283 may include an aperture 286, 287 formed adjacent an end 284, 285 of the respective actuator rod 282, 283. The apertures 286, 287 may have a oval shape. However, others shapes may be used. As a further example, one or more locating pins 288, 289 may be slidabely disposed within the apertures 286, 287 and a portion of the valve plate assembly 54 to control a movement of at least a portion of the valve plate assembly 54.

As more clearly shown in FIGS. 6-9, the valve plate assembly 54 may include a first valve plate 54a, a second valve plate 54b, and a third valve plate 54c. In an aspect, each of the valve plates 54a, 54b, 54c may have similar or different geometries and may be stacked one upon another and integrated into the valve plate assembly 54. The valve plate assembly 54 may include other components and configurations. As an example, the arrangement of the valve plates 54a, 54b, 54c may be configured such that the second valve plate 54b and third valve plate 54c may be rotated, independently of one another, and relative to the first valve plate 54a to control (e.g., maintain, increase, or decrease) the amount of valve plate trap at TDC and at BDC of the rotating group 56, 256. Such a configuration enables improved fluid pressure transitions within the piston chamber (e.g., piston 64, 264) without losing efficiency as the piston passes over TDC and BDC in the pump (e.g., variable displacement axial piston pump 12, variable displacement axial piston pump 212, etc.). Such a configuration may provide a predefined amount of valve plate trap in the valve plate assembly 54 at TDC and at BDC.

In an aspect, the first valve plate 54a may have a face 300 configured to abut the barrel 58, 258. As an example, the face 300 may form a seal between the valve plate assembly 54 and the face of the barrel 58, 258 or other components. One or more arcuate slots 302a, 303a may be defined in the first valve plate 54a and may provide communication between the rotating group 56, 256 and one or more of the inlet port passage 50, 250 (FIGS. 2 and 5) and the outlet port passage 52, 252 (FIGS. 2 and 5). As an example, the arcuate slots 302a, 303a may be formed through the face 300 of the first valve plate 54a.

One or more apertures 304a, 305a may be defined in the first valve plate 54a and may be configured to receive a respective locating pins 306. The locating pin 306 may be fixed to the first valve plate 54a or removably disposed therein. As an example, the apertures 304a, 305a may be annular. However, other shapes can be used. As another example, the locating pins 306 may be cylindrical. However, other shapes and configurations may be used.

In an aspect, the second valve plate 54b may have a face 308 configured to abut the first valve plate 54a and a face 310 configured to abut the third valve plate 54c. As an example, the faces 308, 310 may provide a seal between the abutting valve plates 54a, 54b, 54c. One or more arcuate slots 302b, 303b may be defined in the second valve plate 54b and may provide communication between the rotating group 56, 256 and one or more of the inlet port passage 50, 250 (FIGS. 2 and 5) and the outlet port passage 52, 252 (FIGS. 2 and 5). As an example, the arcuate slots 302b, 303b may be formed through the faces 308, 310 of the second valve plate 54b. As a further example, one or more fluid channels 311 (e.g., micro fluid channels) can be formed (e.g., etched) on one or more of the faces 308, 310 to provide fluid lubrication between the valve plates 54a, 54b, 54c. The fluid channels 311 can be in fluid communication with one or more of the arcuate slots 302b, 303b. As a further example, the faces 308, 310 of the secondary valve plate 54b may be plated with bronze or other materials to reduce friction.

A protrusion 312 (e.g., elevated land) may be formed adjacent one or more of the arcuate slots 302b, 303b. The protrusion 312 may have a first edge 312a and a second edge 312b. The first edge 312a and/or other portions of the protrusion 312 may be configured to abut a portion of one of the arcuate slots 302a, 303a of the first valve plate 54a (See FIGS. 7, 8, and 9). As an example, the first edge 312a may have a shape and size configured to nest within one of the arcuate slots 302a, 303a of the first valve plate 54a. As a further example, the first edge 312a of the protrusion 312 may have a convex shape. The second edge 312b of the protrusion 312 may have a shape similar to an end 314 of one of the arcuate slots 302a, 303a of the first valve plate 54a. As an example, the second edge 312b of the protrusion 312 may have a concave shape. As a further example, a thickness of the protrusion 312 can be configured to match a thickness of the first valve plate 54a such that a top surface 316 of the protrusion 312 is flush with the face 300 of the first valve plate 54a, when the second valve plate 54b is abutting the first valve plate 54a (See FIGS. 7, 8, and 9).

One or more apertures 304b, 305b may be defined in the second valve plate 54b and may be configured to receive the respective locating pins 306. As an example, the apertures 304b, 305b may be arcuate. However, other shapes can be used. As another example, the apertures 304b, 305b may have an interior width configured to receive the locating pins 306. However, other shapes and configurations may be used. In an aspect, the apertures 304b, 305b and the locating pins 306 cooperate to limit a movement of the valve plates 54a, 54b, 54c relative to each other. As an example, the locating pins 306 may extend through the apertures 304b, 305b to fix an orientation of the first valve plate 54a relative to the inlet port passage 50, 250 (FIGS. 2 and 5) and the outlet port passage 52, 252 (FIGS. 2 and 5), while allowing the second valve plate 54b to rotate within the limits of the arcuate apertures 304b, 305b in the second valve plate.

Figure 8:
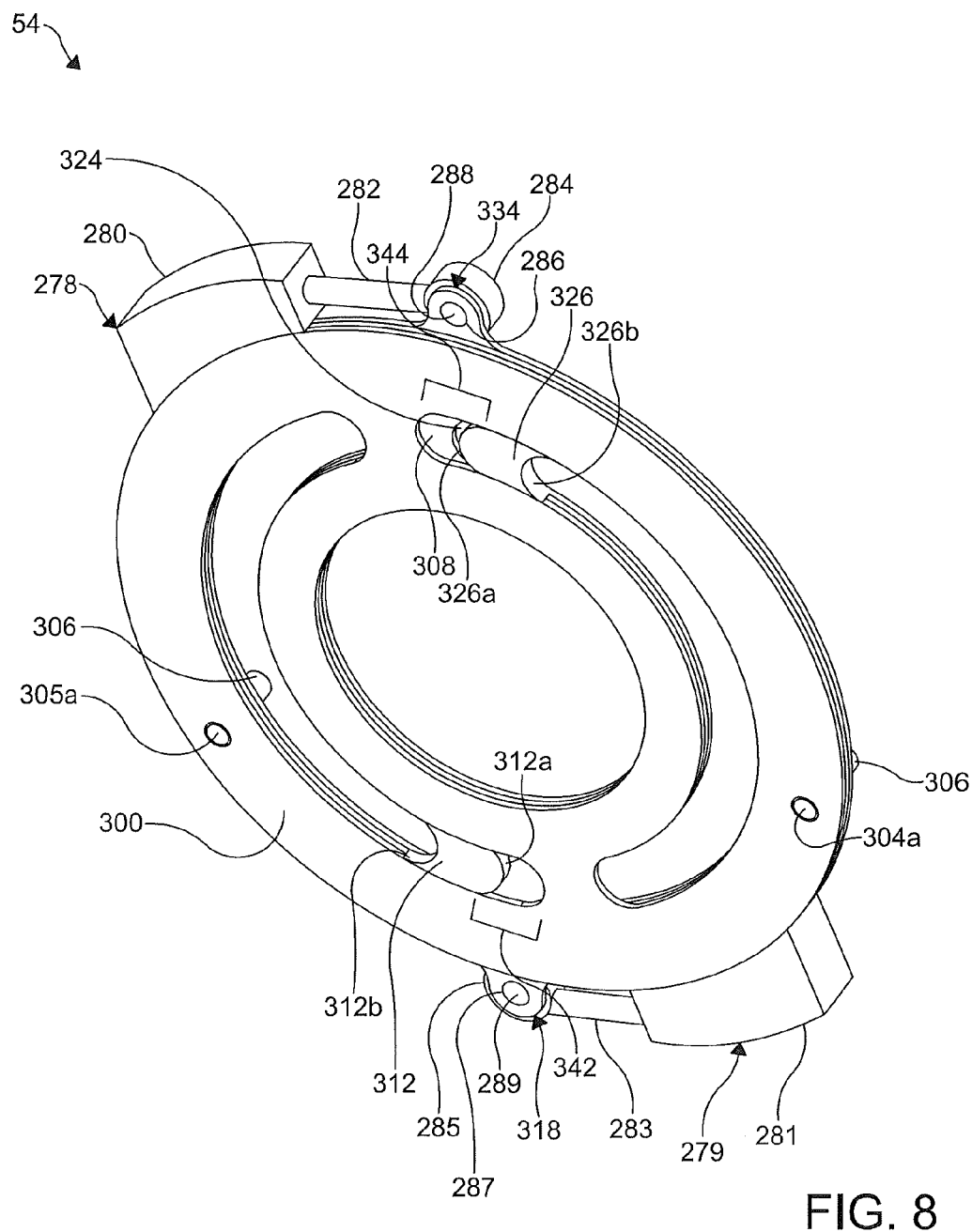
FIG. 8 is an assembled perspective view of the valve plate assembly of FIG. 5 shown in a first position.
Figure 9:
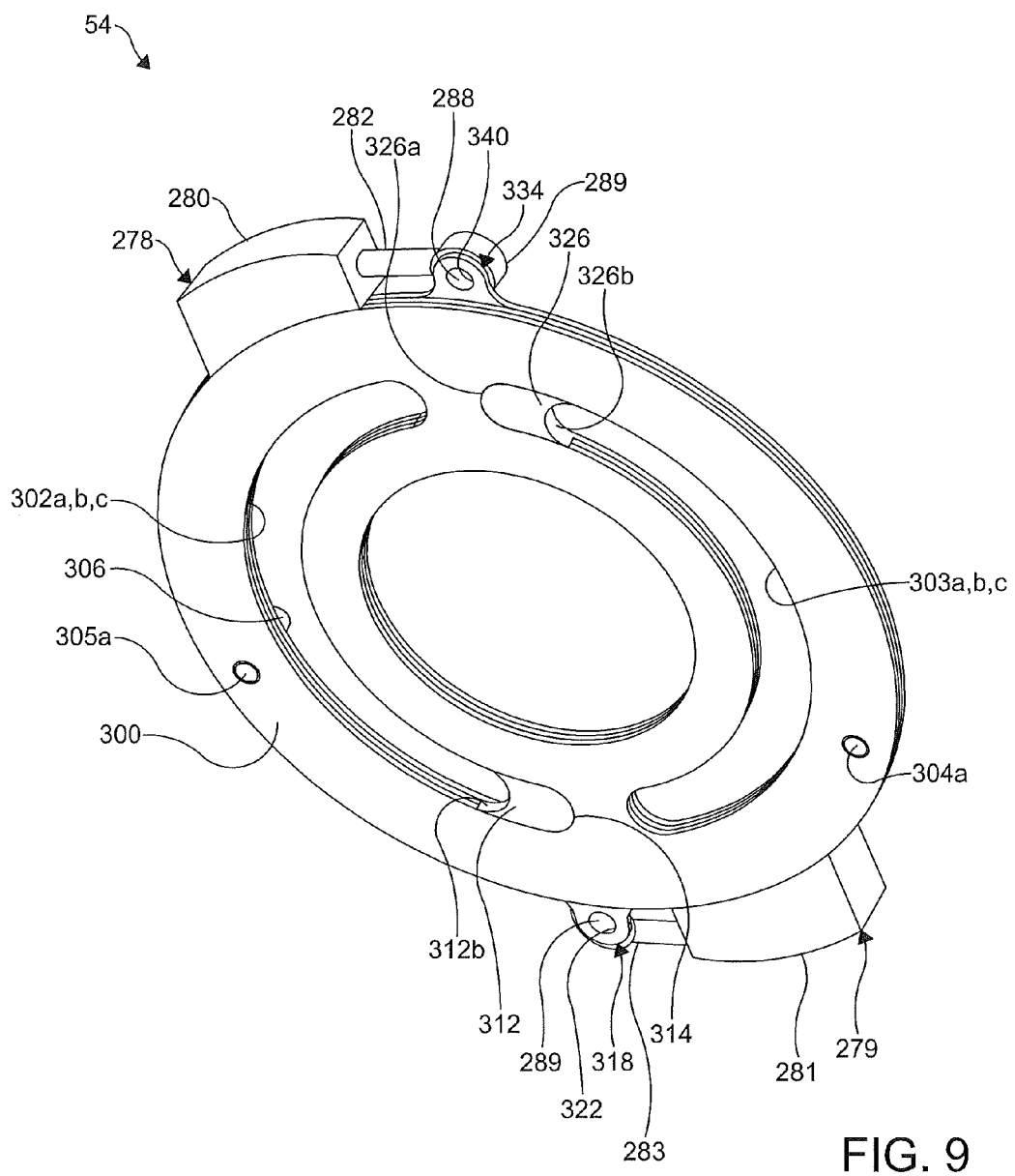
FIG. 9 is an assembled perspective view of the valve plate assembly of FIG. 5 shown in a second position.

A control feature 318 may be formed on the second valve plate 54b or be coupled thereto. In an aspect, the control feature 318 may include a protrusion 320 formed along a peripheral edge 321 of the second valve plate 54b. An aperture 322 may be formed in the protrusion 320 to facilitate an interface between the control feature 318 and a controller such as the actuator assembly 279. As shown in FIGS. 8-9, the actuator assembly 279 may cause the second valve plate 54b to rotate relative to the first valve plate 54a. For example, the locating pin 289 may be disposed in the aperture 322 and the aperture 287 to couple the actuator assembly 279 to the second valve plate 54b. As such, actuator assembly 279 may extend (e.g., linearly) the actuator rod 283 to cause the second valve plate 54b to rotate. Other features having various shapes and sizes may be used to facilitate the controlled movement of the second valve plate 54b.

In an aspect, the third valve plate 54c may have a face 324 configured to abut the second valve plate 54b (e.g., the face 310). As an example, the face 324 may provide a seal between the abutting valve plates 54b, 54c. One or more arcuate slots 302c, 303c may be defined in the third valve plate 54c and may provide communication between the rotating group 56, 256 and one or more of the inlet port passage 50, 250 (FIGS. 2 and 5) and the outlet port passage 52, 252 (FIGS. 2 and 5). As an example, the arcuate slots 302c, 303c may be formed through the face 324 of the third valve plate 54c.

A protrusion 326 (e.g., elevated land) may be formed adjacent one or more of the arcuate slots 302c, 303c. The protrusion 326 may have a first edge 326a and a second edge 326b. The first edge 326a may be configured to abut a portion of one of the arcuate slots 302a, 303a of the first valve plate 54a. As an example, the first edge 326a may have a shape and size configured to nest within one of the arcuate slots 302a, 303a of the first valve plate 54a. As a further example, the first edge 326a of the protrusion 326 may have a convex shape. The second edge 326b of the protrusion 326 may have a shape similar to an end 328 of one of the arcuate slots 302a, 303a of the first valve plate 54a. As an example, the second edge 326b of the protrusion 326 may have a concave shape. As a further example, a thickness of the protrusion 326 can be configured to match a thickness of the first valve plate 54a such that a top surface 330 of the protrusion 326 is flush with the face 300 of the first valve plate 54a, when the third valve plate 54c is abutting the stack of the second valve plate 54b and the first valve plate 54a on the side of the second valve plate 54b. In an aspect, the protrusion 326 may define a gap 332 between the face 324 and a bottom surface 333 of the protrusion 326 equal to the thickness of the second valve plate 54b. As an example, the gap 332 can be configured to slideably receive a portion of the second valve plate 54b when the third valve plate 54c is abutting the stack of the second valve plate 54b and the first valve plate 54a on the side of the second valve plate 54b (See FIGS. 8, and 9).

One or more apertures 304c, 305c may be defined in the third valve plate 54c and may be configured to receive the respective locating pins 306. As an example, the apertures 304c, 305c may be arcuate. However, other shapes can be used. As another example, the apertures 304c, 305c may have an interior width configured to receive the locating pins 306. However, other shapes and configurations may be used. In an aspect, the apertures 304c, 305c and the locating pins 306 may cooperate to limit a movement of the valve plates 54a, 54b, 54c relative to each other (e.g., valve plate 54c relative to valve plate 54a). As an example, the locating pins 306 may extend through the apertures 304c, 305c to fix an orientation of the first valve plate 54a relative to the inlet port passage 50, 250 (FIGS. 2 and 5) and the outlet port passage 52, 252 (FIGS. 2 and 5), while allowing the third valve plate 54c to rotate within the limits of the arcuate apertures 304c, 305c in the third valve plate.

A control feature 334 may be formed on the third valve plate 54c or be coupled thereto. In an aspect, the control feature 334 may include a protrusion 336 formed along a peripheral edge 338 of the third valve plate 54c. An aperture 340 may be formed in the protrusion 336 to facilitate an interface between the control feature 334 and a controller (not shown) such as a linear actuator, as is well known. As shown in FIGS. 8-9, the actuator assembly 278 may cause the third valve plate 54c to rotate relative to the first valve plate 54a. For example, the locating pin 288 may be disposed in the aperture 340 and the aperture 286 to couple the actuator assembly 278 to the third valve plate 54c. As such, actuator assembly 278 may extend (e.g., linearly) the actuator rod 282 to cause the third valve plate 54c to rotate. Other features having various shapes and sizes may be used to facilitate the controlled movement of the third valve plate 54c.

In an aspect, arcuate slots 302a,b,c, 303a,b,c formed in the respective valve plates 54a, 54b, 54c may be configured (e.g., sized and located) such that the rotation of either or both of the second valve plate 54b and the third valve plate 54c will not change the profile of the arcuate slots 302a, 303a (e.g., suction and discharge ports) in the first valve plate 54a, except where intended at TDC and BDC to increase or decrease the amount of valve plate trap required to facilitate an optimal pressure transition of the fluid inside the piston chamber (e.g., piston 64, 264) as it passes between the suction and discharge sides of the pump for given values of pump differential pressure and swash plate angles. As an example, the protrusions 312, 326 may be configured to define a fluid path through the first valve plate 54a (e.g., through at least a portion of the arcuate slots 302a, 303a). This holds true for any orientation of either valve plate 54b, 54c within their range of rotation. As an example, the amount of valve plate trap required at TDC may be less than that required at BDC due to the lesser amount of fluid contained within the piston chamber (e.g., piston 64, 264) at TDC as the swash plate (e.g., swashplate arrangement 76, 276) is angled to produce pump flow.

Figure 7:
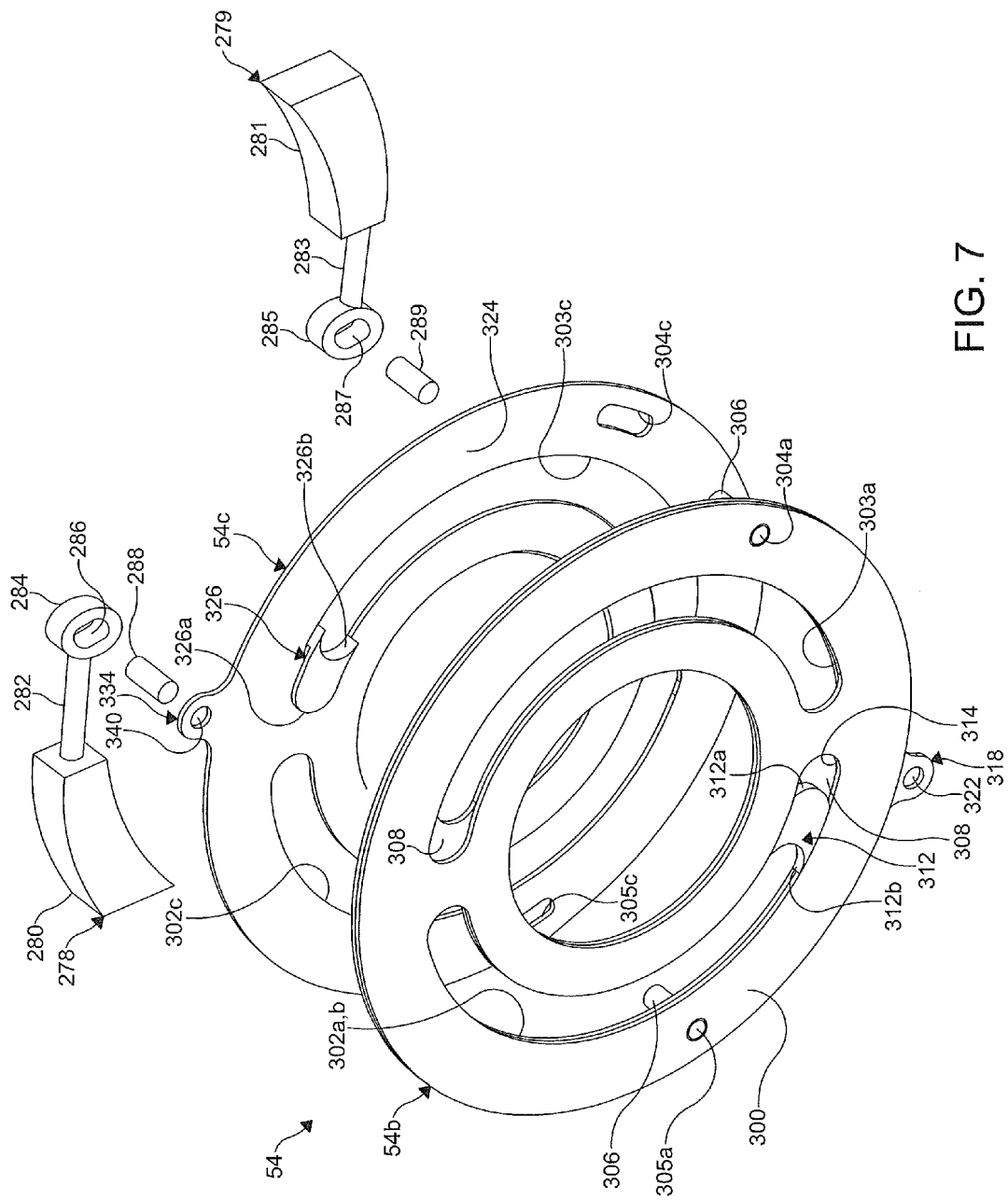
FIG. 7 is a partially exploded perspective view of the valve plate assembly of FIG. 6.

As more clearly shown in FIGS. 7, 8, and 9, the valve plates 54a, 54b, 54c may be slideably disposed adjacent each other. As shown, a relative position (e.g., rotation orientation) of the valve plates 54a, 54b, 54c to each other may define a fluid flow path through the valve plate assembly 54. In FIG. 8, fluid pockets 342, 344 may be defined by the valve plate assembly 54 when the first edges 312a, 326a of the respective protrusions 312, 326 are not abutting the concave end of the arcuate slots 302a, 303a of the first valve plate 54a. During a rotation of one or more of the second valve plate 54b and the third valve plate 54c to increase the volume of the fluid pockets 342, 344 (and thereby an amount of valve plate trap) the dynamic change in volume will be very small compared to the amount of fluid in the piston chamber (e.g., piston 64, 264) at either TDC and BDC. In a certain aspect, the fluid pockets 342, 344 may prove to be an advantage in serving as a "cushion" as the piston (e.g., piston 64, 264) passes over TDC and BDC.

In an aspect, valve plates 54b, 54c can be adjusted independently from one another within an allowed range of motion. Either one of the valve plates 54b, 54c can be rotated independently of the other, or both valves can be opened or closed simultaneously, without opening up any alternate paths for fluid flow other than through the configured portion of the arcuate slots 302a, 303a for which fluid flow is intended. In an aspect, at no combination of rotational positions of the valve plates 54b, 54c will any leak paths be introduced which would allow the fluid in the piston chamber (e.g., piston 64, 264) to flow around the arcuate slots 302a, 303a of the first valve plate 54a.

In an aspect, the following equations can be applied to govern the control of the valve plate assembly 54 within an axial piston pump having a swashplate with one degree of freedom, i.e., rotation in the primary a direction only:

$$z_\alpha := R \cdot \tan(\alpha) \cdot \sin(\theta) \qquad \text{(Eq. 1)}$$

$$V_i := V_o - A_p \cdot z_i \qquad \text{(Eq. 2)}$$

$$P_2 := P_1 - B \cdot \ln\left(\frac{V_2}{V_1}\right) \qquad \text{(Eq. 3)}$$

$$\psi_{t_{i,j}} := a\cos\left[\frac{\exp\left[\frac{(\Delta P_i)}{B}\right] \cdot (V_o - A_p \cdot R \cdot \tan(\alpha_j)) - V_o}{-A_p \cdot R \cdot \tan(\alpha_j)}\right] \qquad \text{(Eq. 4)}$$

$$\psi_{b_{i,j}} := a\cos\left[\frac{\exp\left[\frac{(-\Delta P_i)}{B}\right] \cdot (V_o + A_p \cdot R \cdot \tan(\alpha_j)) - V_o}{A_p \cdot R \cdot \tan(\alpha_j)}\right] \qquad \text{(Eq. 5)}$$

Where:
$z_\alpha$=Equation for the vertical motion of piston following a swashplate with only one degree of rotational freedom (a).
R=Radius of the piston path about the pump axis of rotation labeled 260 in FIG. 3.
α=Swashplate primary angle of rotation
θ=Rotational position of the piston about the axis of rotation 260 in FIG. 3.

$V_i$=Equation for the change of volume of fluid within the piston chamber as a function of its vertical motion.
$V_0$=The amount of fluid within the piston chamber when the swashplate primary angle of rotation is set at the 0° orientation (i.e., pump at zero-flow condition).
$A_p$=The area of the piston cylinder that is slideably disposed within the piston chamber in the barrel.
$z_i$=The vertical displacement of the piston when the swashplate primary angle of rotation is set to an angle greater than zero (i.e., pump at a positive flow condition).
$P_2$=Equation for the change in fluid pressure within a piston chamber as a function of the change in the volume of the piston chamber due to the piston vertical motion.
$P_1$=The initial pressure in the piston chamber before flow is cut off to and from the piston chamber.
B=The fluid bulk modulus.
$V_2$=The final volume of the fluid in the piston chamber after the volume change due to a change in the vertical position of the piston.
$V_1$=The initial volume of the fluid in the piston chamber before the volume change due to a change in the vertical position of the piston.
$\psi_t$=The amount of valve plate trap, in radians or degrees, required to facilitate a complete pressure transition of the fluid within the piston chamber at TDC without any uncontrolled flow into or out of the piston chamber while the piston chamber is cut off from flow from the inlet and discharge ports of the pump.
$\psi_b$=The amount of valve plate trap, in radians or degrees, required to facilitate a complete pressure transition of the fluid within the piston chamber at BDC without any uncontrolled flow into or out of the piston chamber while the piston chamber is cut off from flow from the inlet and discharge ports of the pump.

Figure 10:
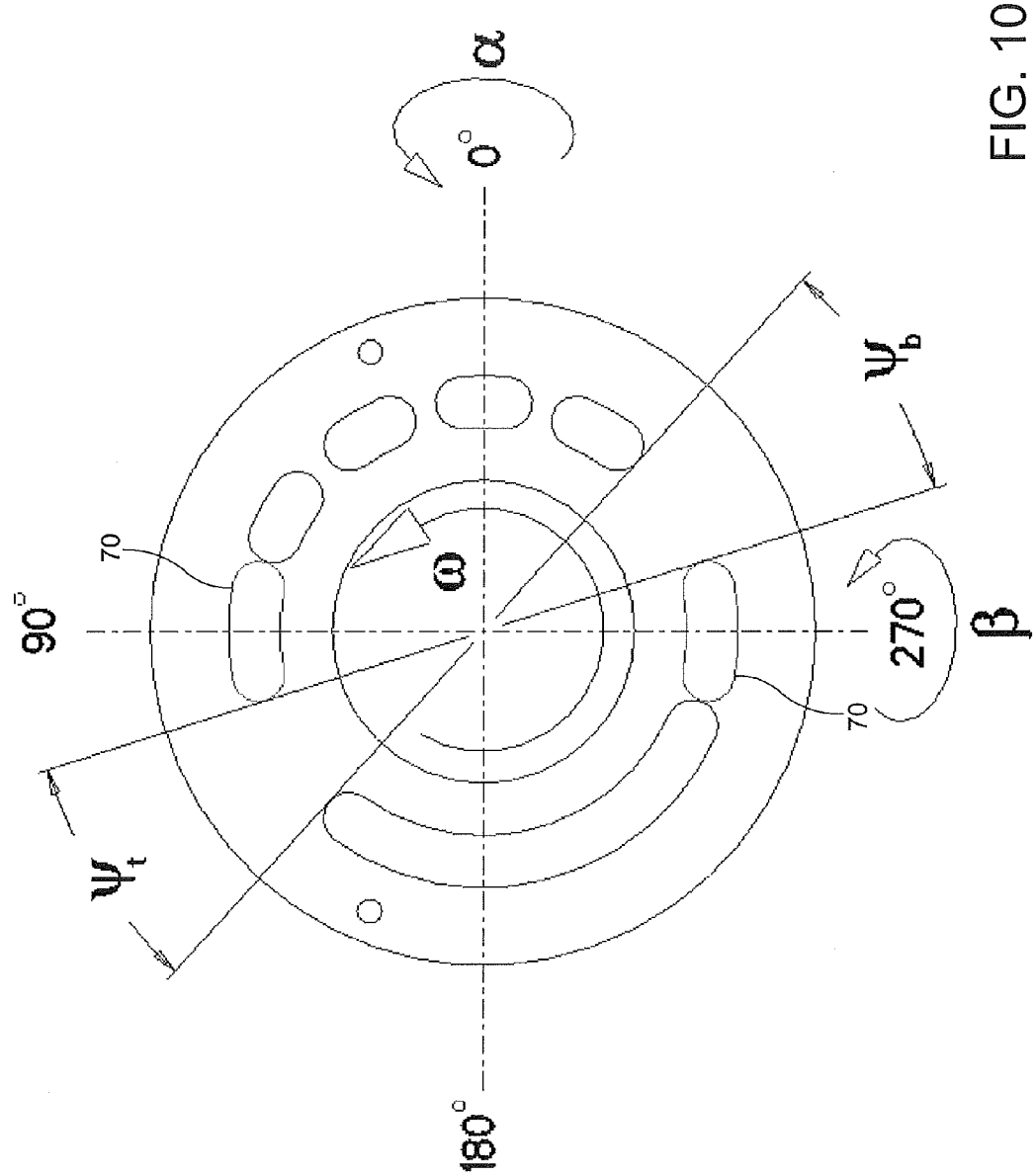
FIG. 10 is a diagrammatic representation of porting of a fluid within the fluid pump of FIG. 2 taken across the line 10-10 of FIG. 2.

Referring to FIGS. 2, 5, and 10, the porting between the barrel 58, 258 and each of the inlet port passage 50, 250 and the outlet port passage 52, 252 of the head portion 46, 246 is more clearly illustrated. For explanation purposes only, the "270" degree position illustrated in FIG. 10 relates to a position on the right side of the drawing of FIG. 2 and the "0" degree position illustrated in FIG. 10 relates to a position on the right side of the drawing of FIG. 3. The "0" and the "180" degree positions represent a neutral axis. The "90" degree position, commonly referred to as the Top Dead Center (TDC) position, represents the point at which the respective closed chambers 70 are at their smallest relative volume for a given displacement of the variable displacement axial piston pump 12, 212. The "270" degree position, commonly referred to as the Bottom Dead Center (BDC) position, represents the point at which the respective closed chambers 70 are at their largest relative volume for a given displacement. The arcuate distances 'delta' TDC and 'delta' BDC represent the distance $\Psi t$ and $\Psi b$ in FIG. 10 that the barrel 58, 258 travels during use in which a trapped volume of fluid within the respective closed chambers 70 are being subjected to changing pressures depending on the direction of movement of the respective pistons 64, 264 within their associated cylinder bores (e.g., cylinder bores 59). As shown in FIG. 10, the valve plate assembly 54 of the disclosure leverages trapped fluid volume at TDC and BDC to facilitate an optimal pressure transition of a fluid within the piston chamber as the piston (e.g., piston 64, 264) passes over from the high to the low pressure side of the variable displacement axial piston pump 12, 212. As such, a power savings may be realized.

Figure 11:
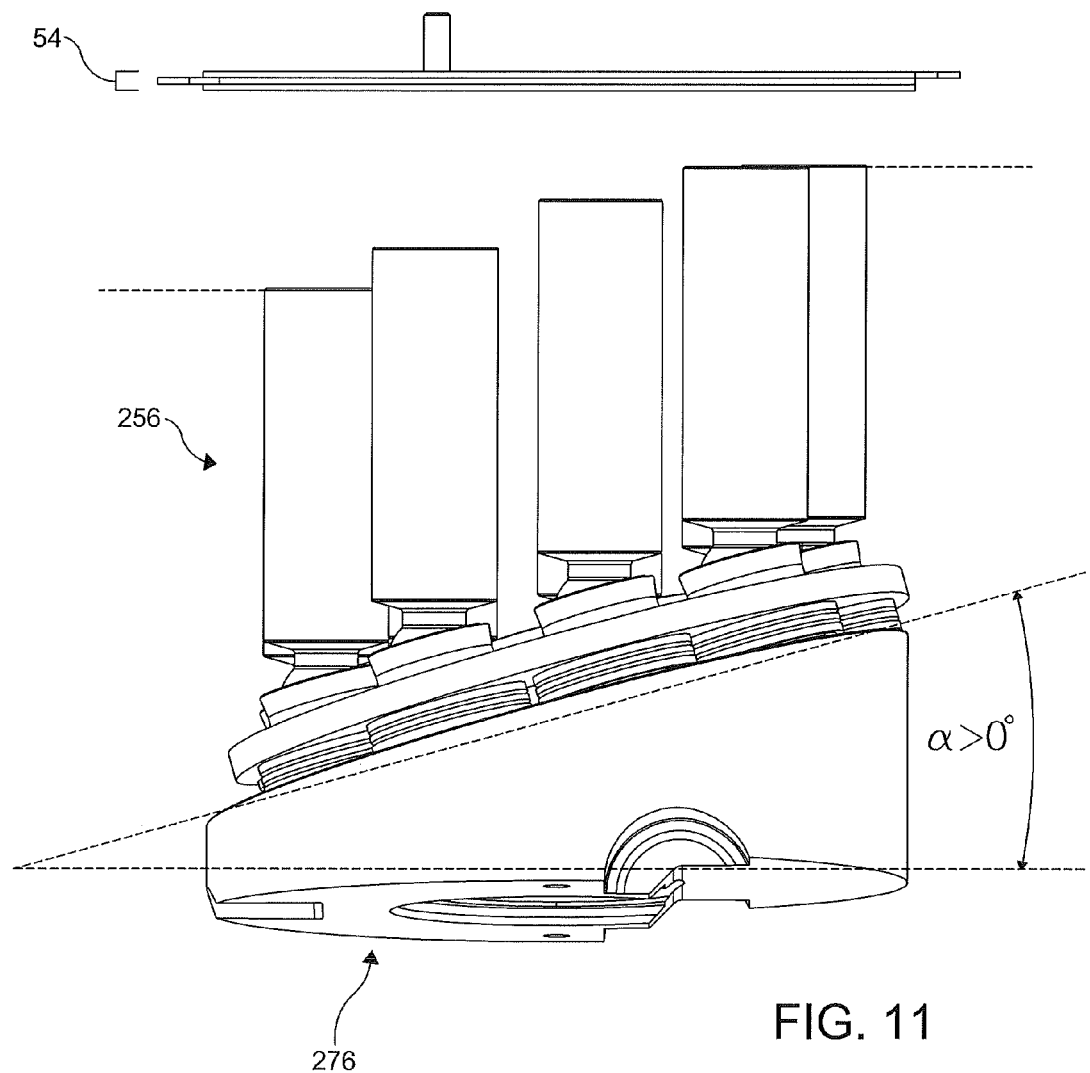
FIG. 11 is a partially exploded side elevation view of the fluid pump system of FIG. 4 with the pump head and barrel hidden.
Figure 12:
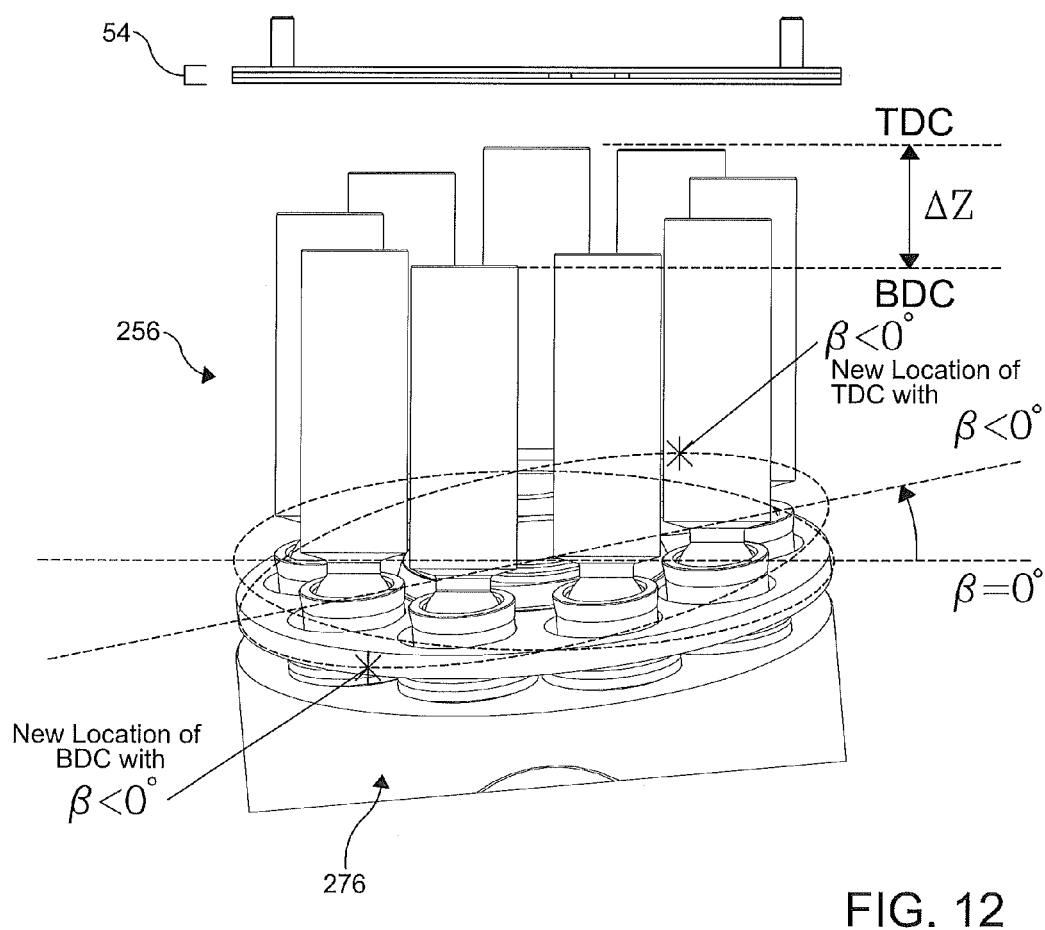
FIG. 12 is a partially exploded front elevation view of the fluid pump system of FIG. 4 with the pump head and barrel hidden.

Referring to FIGS. 11-12, the swashplate arrangement 276 may pivoted in a first direction (e.g., first degree of freedom, arcuate clockwise direction, etc.) relative to the axis of rotation 260 of the rotating group 256. An angle of pivot "α" in the first direction can be measured from a horizontal plane representing 0°. As shown in FIG. 11, α is greater than 0. The swashplate arrangement 276 may also be pivoted in a second direction (e.g., second degree of freedom) relative to the axis of rotation 260 of the rotating group 256. The second direction may be different from the first direction and may slightly shift the position of top dead center and bottom dead center of the rotating group 256. An angle of pivot "β" in the second direction can be measured from a horizontal plane representing 0°, as shown in FIG. 12. As the swashplate arrangement 276 is pivoted in the first direction and/or the second direction, the total change in the piston vertical travel distance from BDC to TDC may be changed, identified as AZ.

In an aspect, the control of the swashplate arrangement 76, 276 with two degrees of rotational freedom may be governed by the following equations:

$$z_{\alpha\beta} := R \cdot \left( \sin(\theta) \cdot \tan(\alpha) - \cos(\theta) \cdot \frac{\tan(\beta)}{\cos(\alpha)} \right) \tag{Eq. 6}$$

$$V_i := V_o - A_p \cdot z_i \tag{Eq. 7}$$

$$P_2 := P_1 - B \cdot \ln\left(\frac{V_2}{V_1}\right) \tag{Eq. 8}$$

$$\beta_{b_{i,j}} := \tag{Eq. 9}$$

$$a\tan\left[ \frac{\exp\left(\frac{-\Delta P_i}{B}\right) \cdot (V_o - A_p \cdot R \cdot \sin(\theta_b) \cdot \tan(\alpha_j)) - V_o + A_p \cdot R \cdot \sin(\theta_b + \psi_{bdc}) \cdot \tan(\alpha_j)}{-\exp\left(\frac{-\Delta P_i}{B}\right) \cdot A_p \cdot R \cdot \cos(\theta_b) + A_p \cdot R \cdot \cos(\theta_b + \psi_{bdc})} \cdot \cos(\alpha_j) \right]$$

$$\beta_{t_{i,j}} := a\tan\left[ \frac{\exp\left(\frac{(\Delta P_i)}{B}\right) \cdot (V_o - A_p \cdot R \cdot \sin(\theta_t) \cdot \tan(\alpha_j)) - V_o + A_p \cdot R \cdot \sin(\theta_t + \psi_{tdc}) \cdot \tan(\alpha_j)}{-\exp\left(\frac{\Delta P_i}{B}\right) \cdot A_p \cdot R \cdot \cos(\theta_t) + A_p \cdot R \cdot \cos(\theta_t + \psi_{tdc})} \cdot \cos(\alpha_j) \right] \tag{Eq. 10}$$

Where:
$z_{\alpha\beta}$=Equation for the vertical motion of a piston following a swashplate with two degrees of rotational freedom (α and β).
R=Radius of the piston path about the pump axis of rotation labeled 260 in FIG. 3.
θ=Rotational position of the piston about the axis of rotation 260 in FIG. 3.
α=Swashplate primary angle of rotation.
β=Swashplate secondary angle of rotation.
$V_i$=Equation for the change of volume of fluid within the piston chamber as a function of its vertical motion.
$V_0$=The amount of fluid within the piston chamber when the swashplate primary and secondary angles of rotation are set at 0° orientation (i.e., pump at a no-flow condition).
$A_p$=The area of the piston cylinder that is slideably disposed within the piston chamber in the barrel.
$z_i$=The vertical displacement of the piston when the swashplate primary angle of rotation is set to an angle greater than zero (i.e., pump at a positive flow condition).

$P_2$=Equation for the change in fluid pressure within a piston chamber as a function of the change in the volume of the piston chamber due to the piston vertical motion.
$P_1$=The initial pressure in the piston chamber before flow is cut off to and from the piston chamber.
B=The fluid bulk modulus.
$V_2$=The final volume of the fluid in the piston chamber after the volume change due to a change in the vertical position of the piston.
$V_1$=The initial volume of the fluid in the piston chamber before the volume change due to a change in the vertical position of the piston.
$\beta_b$=The amount of secondary swash plate rotation required at BDC to facilitate a perfect pressure transition of the fluid within the piston chamber as the piston passes over from the inlet to the discharge side of the pump with the given amount of valve plate trap provided at BDC. NOTE: There can only be one value of β common to both BDC and TDC simultaneously within the pump. Therefore, the amount of valve plate trap required to facilitate the pressure transition completely at BDC will always be greater than the amount of valve plate trap required at TDC due to the greater amount of fluid being in the piston chamber at BDC for all conditions of positive pump flow.
$\beta_t$=The amount of secondary swash plate rotation required at TDC to facilitate a perfect pressure transition of the fluid within the piston chamber as the piston passes over from the inlet to the discharge side of the pump with the given amount of valve plate trap provided at TDC. NOTE: There can only be one value of β common to both TDC and BDC simultaneously in the pump. Therefore, the amount of valve plate trap required to facilitate the pressure transition completely at TDC will always be less than the amount of valve plate trap required at BDC due to less fluid being in the piston chamber for all conditions of positive pump flow.

Eq. 9 represents the amount of secondary swash plate rotation required at BDC to facilitate a perfect pressure transition of the fluid within the piston chamber as the piston passes over from the suction side to the discharge side of the pump. This equation is calculated using the maximum value of valve plate trap available in the valve plate arrangement at BDC to provide the precise differential pressure increase required to ensure an optimal pressure transition in the piston chamber at BDC.

Eq. 10 represents the amount of secondary swash plate rotation required at TDC to facilitate a perfect pressure transition of the fluid within the piston chamber as the piston passes over from the discharge side to the suction side of the pump. This equation may be iteratively solved for Ψtdc to arrive at the value of valve plate trap required at TDC when the swashplate arrangement 76, 276 is rotated about its secondary direction to provide a differential pressure increase and optimal pressure transition at BDC.

In an aspect, after the variable amount of valve plate trap that is designed into the valve plate assembly 54 has been exhausted, the swashplate arrangement 76, 276 can then be rotated about its secondary "β" axis according to the equation below as demand is placed upon the pump for increased pump differential pressure above what the valve plate assembly 54 was designed to provide. In Eq. 9, $\beta_b$ is the calculated amount of secondary swash plate rotation required at BDC to provide this increase in pump differential pressure while still maintaining an optimal pressure transition at BDC given the maximum available trap distance $\Psi_{bdc}$ that was designed into the valve plate assembly 54:

$$\beta_{b_{i,j}} := a\tan\left[\frac{\exp\left(\frac{-\Delta P_i}{B}\right) \cdot (V_o - A_p \cdot R \cdot \sin(\theta_b) \cdot \tan(\alpha_j)) - V_o + A_p \cdot R \cdot \sin(\theta_b + \psi_{bdc}) \cdot \tan(\alpha_j)}{-\exp\left(\frac{-\Delta P_i}{B}\right) \cdot A_p \cdot R \cdot \cos(\theta_b) + A_p \cdot R \cdot \cos(\theta_b + \psi_{bdc})} \cdot \cos(\alpha_j)\right] \quad \text{(Eq. 11)}$$

In an aspect, since the amount of fluid in the piston chamber at TDC is less than the amount of volume at BDC as the swash plate angle α is increased from zero, the following adjustment may be made in the valve setting at TDC to effect a perfect pressure transition at that location when the second degree of swash plate rotation is implemented. In the equation below, $\beta_t$ is the amount of secondary swash plate rotation that would be required at TDC for fixed values of trap distance, pump differential pressure and swash plate angle:

$$\beta_{t_{i,j}} := a\tan\left[\frac{\exp\left(\frac{(\Delta P_i)}{B}\right) \cdot (V_o - A_p \cdot R \cdot \sin(\theta_t) \cdot \tan(\alpha_j)) - V_o + A_p \cdot R \cdot \sin(\theta_t + \psi_{tdc}) \cdot \tan(\alpha_j)}{-\exp\left(\frac{\Delta P_i}{B}\right) \cdot A_p \cdot R \cdot \cos(\theta_t) + A_p \cdot R \cdot \cos(\theta_t + \psi_{tdc})} \cdot \cos(\alpha_j)\right] \quad \text{(Eq. 12)}$$

Since the amount of secondary swash plate rotation is already established for the BDC condition in Eq. 11, the value for $\beta_b$ must be substituted into Eq. 12 to solve for $\Psi_{TDC}$, or the amount of angular trap distance required to effect a perfect pressure transition at TDC given the amount of secondary swash plate rotation set forth for the BDC condition. The solution of the equation below for $\Psi_{TDC}$ will determine the amount of angular trap required at TDC to effect a perfect pressure transition at that location. As an example, setting $\beta_t$ in Eq. 12 equal to the value of $\beta_b$ in Eq. 11 (since the amount of secondary swash plate rotation will already be established for the BDC condition), one can solve for $\Psi_{TDC}$ to determine the precise amount of trap required at TDC to facilitate an optimal pressure transition at TDC with the new pump differential pressure and swash plate angle. As a further example, as β is increased to accommodate the increase in pump differential pressure beyond the capacity of the trap available in the new valve plate, $\Psi_{TDC}$, or the amount of trapped distance at TDC, will need to be decreased slightly as pump differential pressure increases in order to compensate for the lesser amount of fluid in the piston chamber at TDC.

To solve the equation above for $\Psi_{TDC}$, one may need to rearrange Eq. 12 to put ΔΨ on one side of the equation as follows:

$$\sin(\theta + \psi) * \tan(\alpha) - \cos(\theta + \psi) * \frac{\tan(\beta)}{\cos(\alpha)} =$$
$$e^{\left(-\frac{\Delta P}{B}\right)} * \left(V_o - A_P * R * \left(\sin(\theta) * \tan(\alpha) - \cos(\theta) * \frac{\tan(\beta)}{\cos(\alpha)}\right)\right) - V_o$$

Where:
ψ=Amount of valve plate trap (in radians or degrees) representing the general case for how this variable is to be solved using an iterative calculation method when a (swashplate primary angle), (swashplate secondary angle), ΔP (pump differential pressure), B (fluid bulk modulus), $V_o$ (piston chamber neutral volume), $A_p$ (piston cross-sectional area), R (piston path radius about pump shaft axis) are all known.

The amount of secondary swash plate rotation that was calculated to effect the perfect pressure transition at BDC at the higher differential pressure can be inputted with theta (θ) equal to 90° (solving for ΔΨ at TDC), resulting in:

$$\sin(\theta + \psi_{TDC}) * \tan(\alpha) - \cos(\theta + \psi_{TDC}) * \frac{\tan(\beta_{BDC})}{\cos(\alpha)} =$$

$$e^{\left(-\frac{\Delta P}{B}\right)} * \left(V_o - A_P * R * \left(\sin(\theta) * \tan(\alpha) - \cos(\theta) * \frac{\tan(\beta_{BDC})}{\cos(\alpha)}\right)\right) - V_o$$

Where:
$\psi_{TDC}$=Amount of valve plate trap (in radians or degrees) at the top dead center position within the pump representing the specific case for how this variable is to be solved using an iterative calculation method when α (swashplate primary angle), β (swashplate secondary angle), ΔP (pump differential pressure), B (fluid bulk modulus), $V_o$ (piston chamber neutral volume), $A_p$ (piston cross-sectional area), R (piston path radius normal to the pump shaft axis) are all known.

As the pump differential pressure is decreased from this point, the secondary angle β of the two-degree-of-freedom swash plate then returns toward zero while the amount of valve plate trap at TDC is simultaneously restored back to its original value before the second degree of swash plate angle was implemented to deliver pump differential pressure above the capacity of the valve plate assembly 54. As the pump demands for differential pressure decrease to this point of restoration, the secondary swash plate angle returns to zero at which point the valve plate assembly 54 regains complete control of providing the precise amount of valve plate trap at TDC and BDC by independently adjusting the valves at TDC and BDC to control the pressure transitions in the pump. In certain aspects, the secondary direction of swash plate rotation is utilized only when the demand on the pump for increased differential pressure and flow is above the capacity designed into the valve plate assembly 54. If the pump differential pressure goes above, or the swash plate angle goes below, what the maximum amount of valve plate trap that is designed into the valve plate assembly 54 can accommodate for the pressure transition, then the second degree of swash plate rotation is activated to deliver the pressure and flow requirements at BDC as the valve at BDC remains fixed at the maximum possible value and as the valve at TDC in the valve plate assembly 54 continues to adjust to facilitate the continued perfect transition at TDC given the new pump operating conditions.

Figure 13:
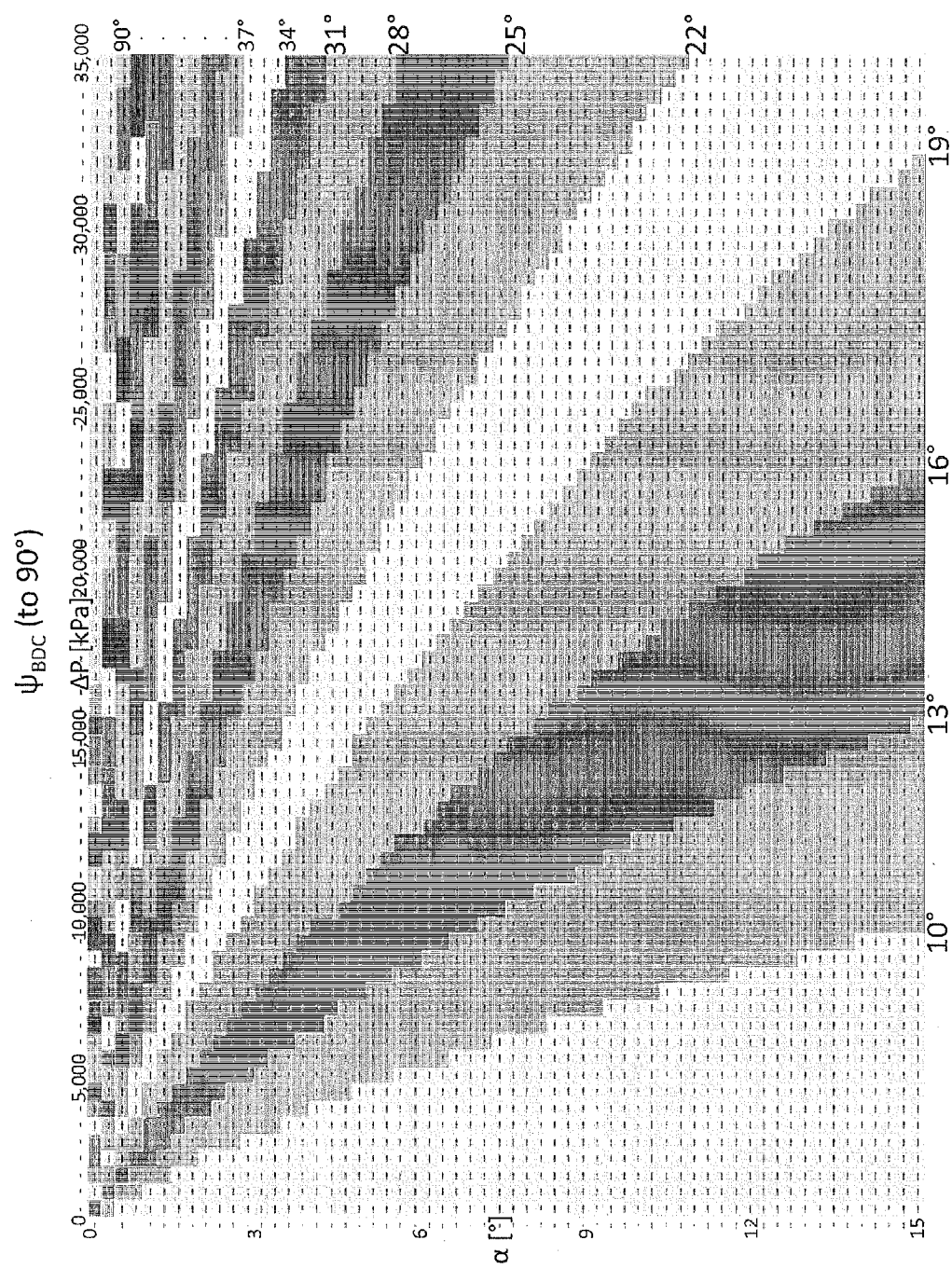
FIG. 13 illustrates a layer plot (in three-degree increments to 90°) of the amount of valve plate trap (°) which would be required at BDC to facilitate the pressure transition completely for a pump operating within the parameters of $\Delta P=0-35,000$ kPa and $\alpha=0°-15°$.
Figure 14:
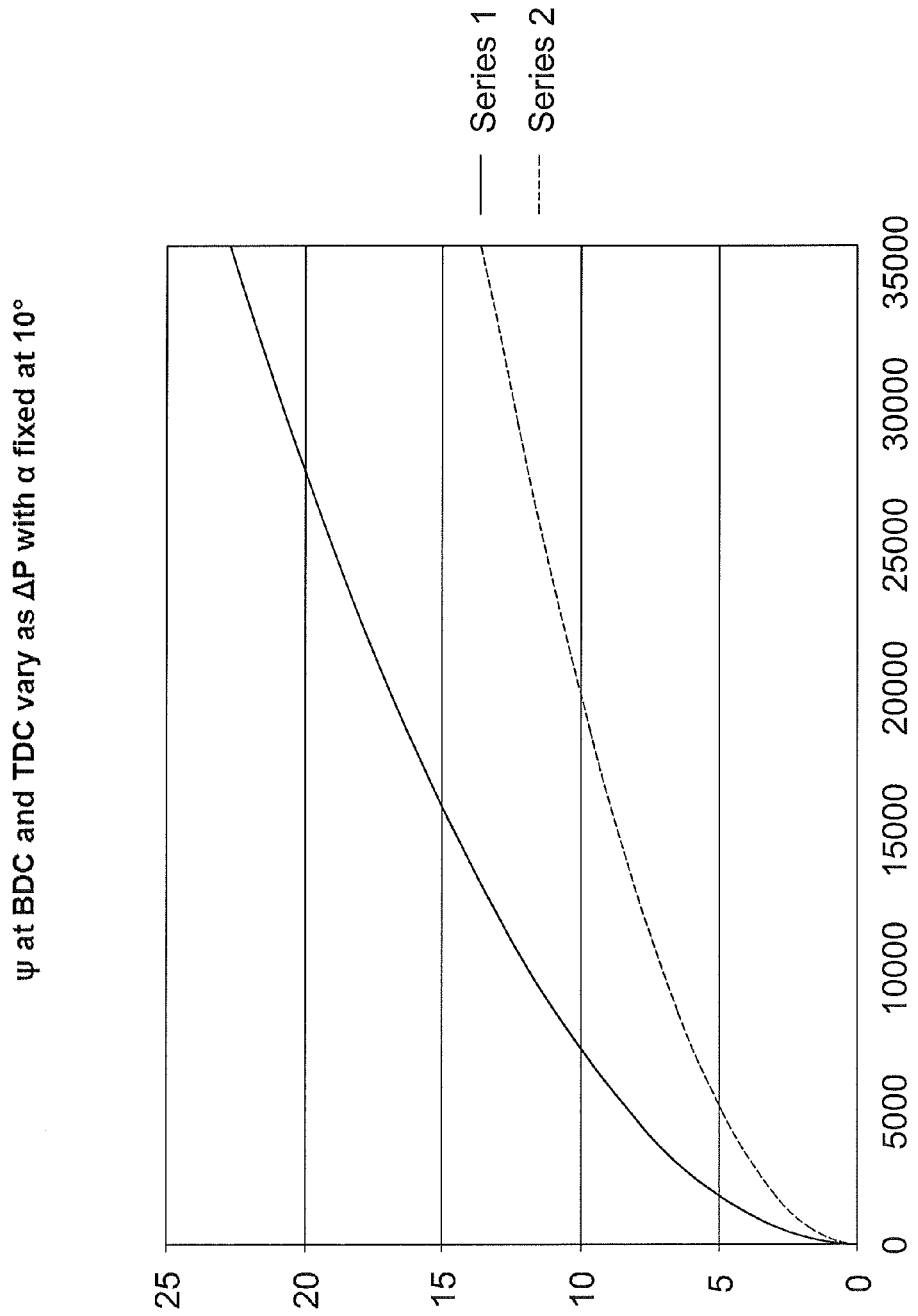
FIG. 14 illustrates a plot of valve plate trap (°) required at BDC and TDC for a pump operating within the parameters of $\Delta P=0-35,000$ kPa with $\alpha$ fixed at 10°.
Figure 15:
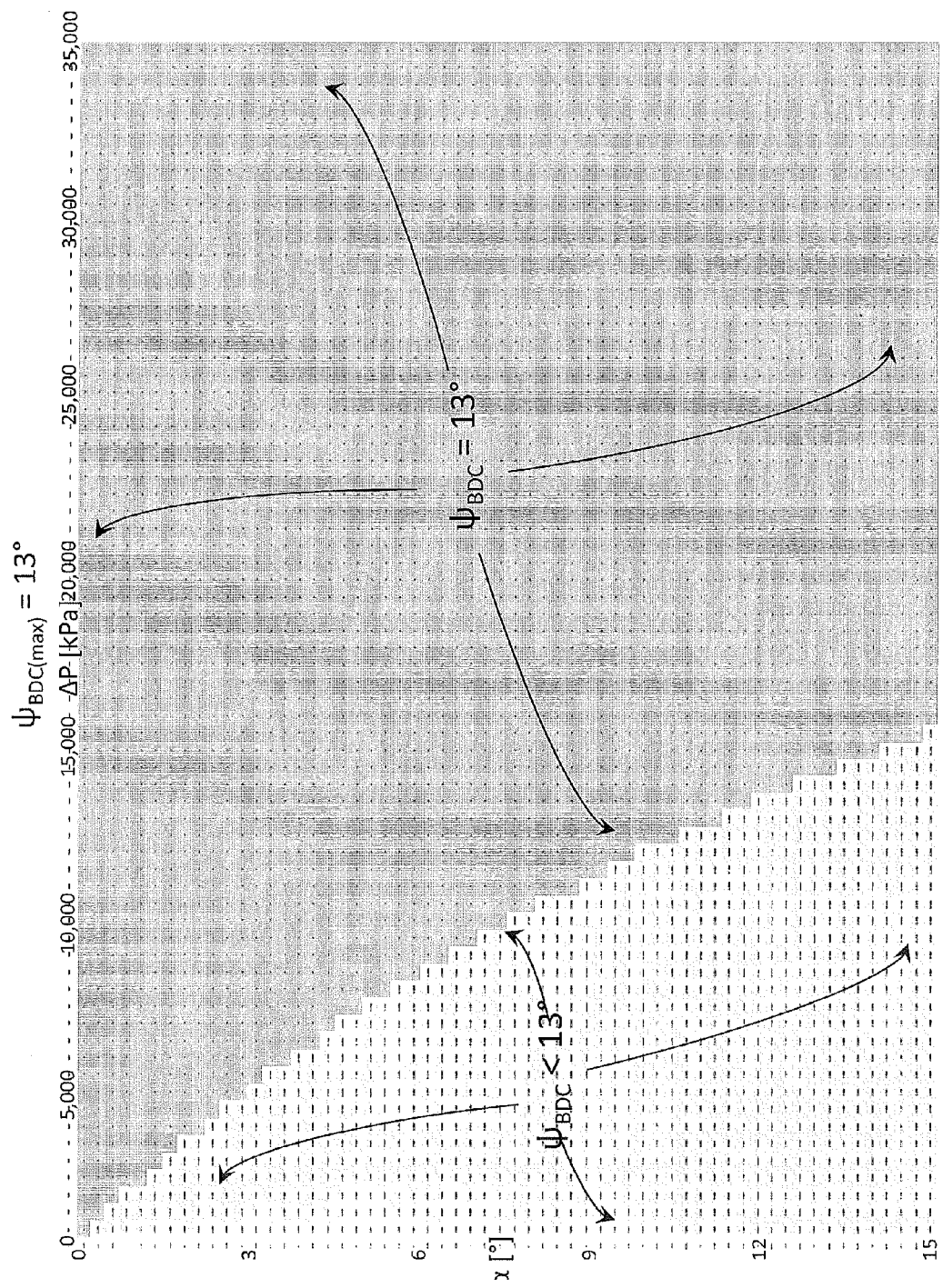
FIGS. 15-17 illustrate plots of $\Psi_{BDC}$, $\beta$, and $\Psi_{TDC}$ required for a pump operating within the parameters of $\Delta P=0-35,000$ kPa and $\alpha=0°-15°$ when the max amount of valve plate trap in the valve plate arrangement is limited to 13°.
Figure 16:
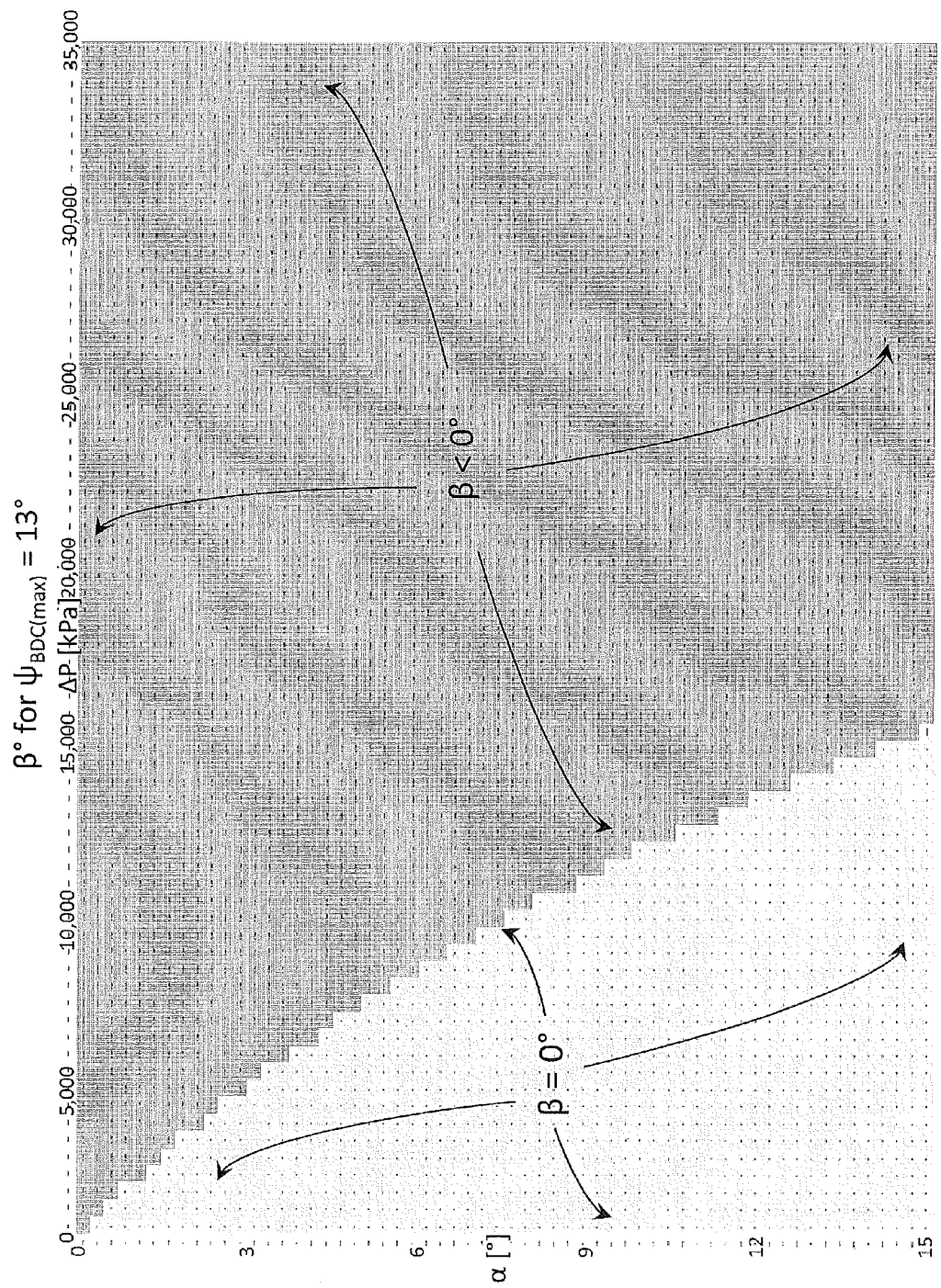
Figure 17:
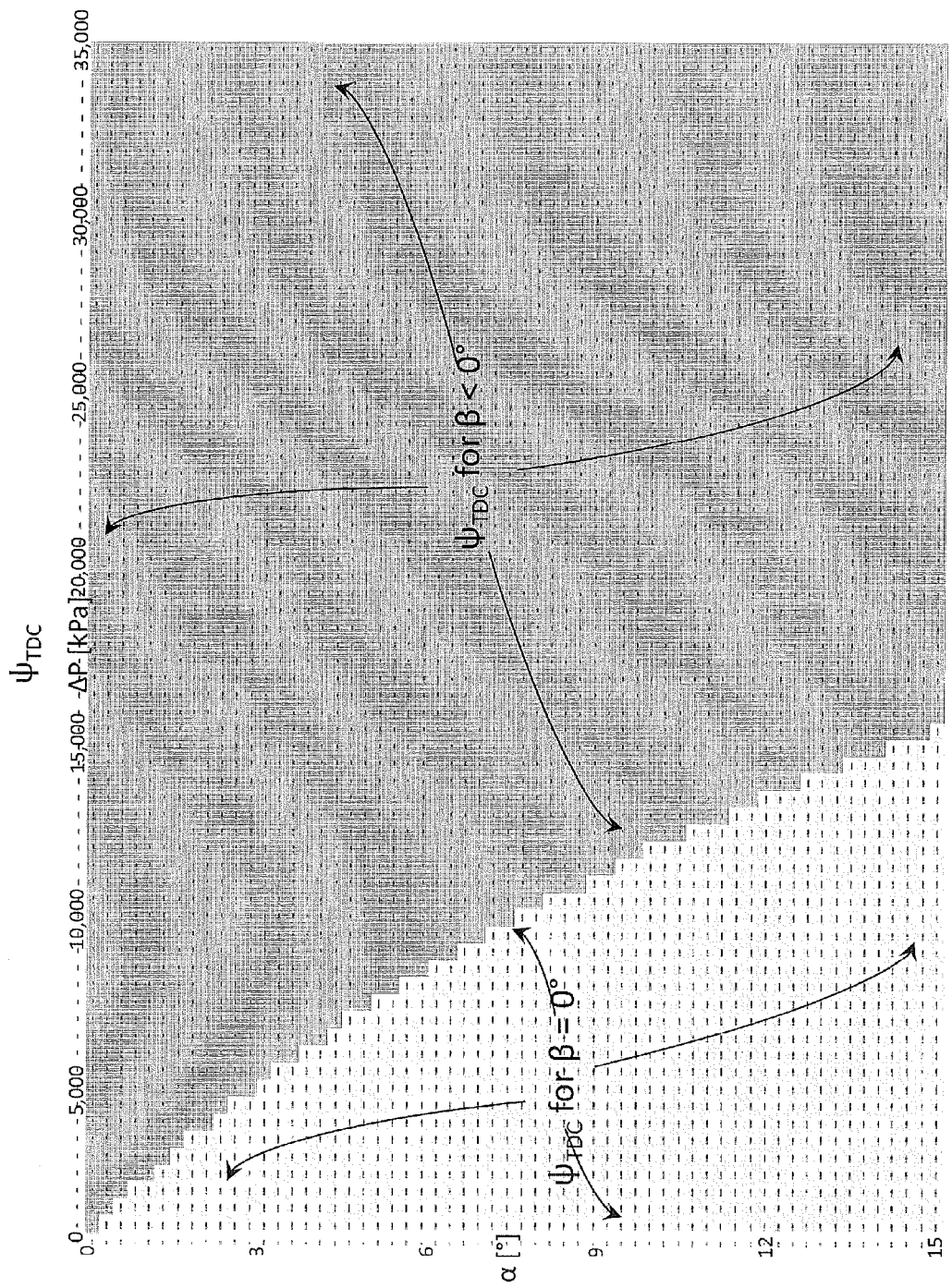

As an example, FIG. 13 illustrates a plot of the valve plate trap (°) required at BDC for a pump operating within the parameters of ΔP=0-35,000 kPa and α=0°-15°, with the example pump specifications outline below:
Pump specs:
R=50 mm (the radius of piston rotation about the vertical axis of the pump)
d=25 mm (piston diameter)
$A_p$=491 mm² (piston area)
B=1379310 kPa (fluid bulk modulus)
$V_o$=9 cm³ (piston cylinder volume of fluid when the swash plate angle α is zero)
As an example, FIG. 14 illustrates a plot of valve plate trap (°) required at BDC and TDC for a pump operating within the parameters of ΔP=0-35,000 kPa with α fixed at 10°, with the example pump specifications outline below:
Pump specs:
R=50 mm (the radius of piston rotation about the vertical axis of the pump)
d=25 mm (piston diameter)
$A_p$=491 mm² (piston area)
B=1379310 kPa (fluid bulk modulus)
$V_o$=9 cm³ (piston cylinder volume of fluid when the swash plate angle α is zero)
As an example, FIGS. 15-17 illustrate plots of $\Psi_{BDC}$, β, and $\Psi_{TDC}$ required to effect perfect pressure transitions within the piston chamber in a pump operating within the parameters of ΔP=0-35,000 kPa and α=0°-15° when the max amount of valve plate trap (°) in the valve plate assembly 54 is limited to 13°, with the example pump specifications previously outlined.

In an aspect, the valve plate assembly 54 can be disposed in a fixed displacement axial piston pump. As such, the valve plate assembly 54 may be adjusted at BDC and TDC to facilitate pressure transitions only when the pressure demand on the pump changes, as the swash plate angle would be fixed. To visualize this application, one may select a row (the same row corresponding to the fixed angle of the swash plate) in each of the charts in FIGS. 15-17 and read across to retrieve the values of valve plate trap required at BDC and TDC.

INDUSTRIAL APPLICABILITY

Operation will be discussed in reference to the variable displacement axial piston pump 12 illustrated in FIGS. 2-3. However, other variable displacement axial piston pumps 212 may operate in a similar manner. For example, the operator may initiate an input to the fluid control valve 20 to direct pressurized fluid to one end of the fluid actuator 26 moving it in the desired direction. The fluid being exhausted from the other end of the fluid actuator 26 returns to the tank 14 across the control valve 20 in a conventional manner. The operator's input results in a simultaneous command, based on the load requirements, being delivered to the operating lever to pivot the primary member 78 to a flow producing angle. In the subject variable displacement axial piston pump 12, the angle ranges from 0 degrees to 15 degrees. It is recognized that the magnitude of the angle range could be more or less without departing from the subject disclosure. An input command to the operating lever 86 acts to rotate the primary member 78 in a clockwise direction as viewed in FIG. 2. Once the primary member 78 is pivoted to a desired angular position, the respective pistons 64 of the plurality of piston assemblies 62 reciprocate within the respective cylinder bores 59 of the barrel 58. As the barrel 58 rotates in a counterclockwise direction (as viewed from above), the piston 64 begins to withdraw from the cylindrical bore 59 due to the fact that the shoe 66 is following the flat surface 92 of the secondary member 80 that is still at its "0" degree position relative to the primary member 78. Since the flat surface 92 is at an angle with respect to the axis of rotation 60, the distance between the flat surface 92 and the end surface 68 of the barrel 58 is increasing toward BDC. The movement of the piston 64 results in an increase in the volumetric space within the closed chamber 70 until the piston reaches the BDC position. As illustrated in FIG. 10, an arcuate distance is defined at location 270° in which the closed chamber 70 is not in communication with either the outlet port passage 52 (e.g., through the arcuate slots 302a, b,c of the valve plate assembly 54) or with the inlet port passage 50 (e.g., through the arcuate slots 303a,b,c of the valve plate assembly 54). Consequently, there is a trapped volume of fluid within the closed chamber 70 that is contracting since the volumetric size of the closed chamber 70 is decreasing as the piston begins its ascent to TDC. Once the closed chamber 70 reaches one of the arcuate slots 302a,b,c of the valve plate assembly 54, fluid from the piston chamber 70 begins to exit through the outlet port passage 52 (e.g., though the arcuate slots 302a,b,c of the valve plate assembly 54) the closed chamber 70 to deliver pump flow. It should be recognized that at the TDC position of the closed chamber 70, the fluid within the closed chamber 70 was still pressurized since it had just left communication with the arcuate slots 302a,b,c of the valve plate assembly 54. Naturally, the pressurized fluid at TDC is transformed to tank pressure by the time the closed chamber 70 enters the arcuate slots 303a,b,c of the valve plate assembly 54 by virtue of the valve plate trap provided by the valve plate assembly 54 at TDC. This is referred to as 'the pressure transition' and it occurs for the fluid in the piston chamber at BDC and TDC as the piston chamber crosses over from the high to the low pressure side of the pump, and vice versa.

Again, once the closed chamber 70 reaches the BDC position, the closed chamber is totally filled with fluid at tank pressure, which in the subject arrangement is atmospheric pressure. At the BDC position, the closed chamber 70 is at its largest volumetric value. As the rotation of the barrel 58 in a counterclockwise direction (as viewed from above) moves the closed chamber 70 past the BDC position, the piston 64 begins to retract into the cylinder bore 59 which reduces the volume of the closed chamber 70. From the time the closed chamber 70 leaves the 270° position, the fluid within the closed chamber 70 is trapped from both the tank and the pressure port according to the amount of valve plate trap set at BDC. During the piston's ascent from BDC to TDC, the fluid is being compressed. Once the closed chamber 70 reaches the arcuate slots 302a,b,c of the valve plate assembly 54, the fluid in the closed chamber 70 enters the arcuate slots 302a,b,c of the valve plate assembly 54 and is forced through the exhaust side of the pump at high pressure to the fluid actuator 26 to do work in a conventional manner. From the time that the closed chamber 70 leaves the BDC position and traverses through the angular trap distance set by the valve plate arrangement at BDC, the fluid therein goes from atmospheric pressure to the higher pressure level present within the arcuate slots 302a,b,c of the valve plate assembly 54, which as noted above is referred to as 'the pressure transition.' As the closed chamber 70 continues to move towards the TDC position, the fluid therein is continually being expelled therefrom at the system operating pressure.

In order to smooth out the respective pressure transitions and improve system operating efficiencies, the volume of trapped fluid in the piston chamber at the TDC and BDC positions are closed to both ports of the pump, and during these transitions, the pressure rise or decline within the piston chamber is controlled according to the angular distance that the piston must travel while being closed to external fluid pressure sources. As an example, the magnitude of fluid decompression and compression needed at the TDC and BDC positions, respectively, are similar but not the same depending upon the setting of the primary swashplate angle α which produces flow within the pump. Consequently, the valve plate assembly 54, used with a fixed swashplate or in conjunction with the two-degree-of-freedom swashplate, will work to perfect the pressure transitions at TDC and BDC. It should be recognized that the fluid compression requirements change as the system and/or pump parameters change.

In the subject arrangement, the pressures of the fluid in the tank inlet conduit 16 and the supply conduit 18 are being sensed by pressure sensors 28, 30 and representative signals delivered to the controller 32 to establish a deferential pressure between the inlet port passage 50 and the outlet port passage 52. Likewise, the position of the primary member 78 is being sensed by the position sensor 40 and the representative signal delivered to the controller 32. These system parameters are then being used to determine the rotational orientation of valve plates 54b, 54c and what position to pivot the secondary member 80. Consequently, for any differential pressure between the inlet and outlet passages 50, 52 and any angular position of the primary member 78, the controller 32 may modify an angle of the swashplate arrangement 76 and/or the positions of the valve plates 54b, 54c.

As clearly indicated in FIG. 12, any combined movement of both the primary member 78 and the secondary member 80 results in the changing of location of TDC and BDC positions. From a review of FIGS. 9-10 it is noted that the closed chamber 70 is still in communication with the arcuate slots 302a,b,c of the valve plate assembly 54 at a location less than 90 degrees but due to the change in location of the TDC position (FIG. 12), the volume of the closed chamber 70 is at its smallest volume at TDC and is slightly increasing as the piston continues toward the 90° position as is noted from the outline 146 that represents the path of the piston 64. However, the pressure of the fluid in the fluid system 10 remains the same. As the closed chamber 70 increases from the 90 degree position, communication with the pump intake and discharge ports through the arcuate slots 302a,b,c and 303a,b,c of the valve plate assembly 54 is interrupted. As the closed chamber 70 moves through the $\Psi_t$ arc, the pressure within the closed chamber 70 is being reduced at a more gradual rate and once it opens into one of the arcuate slots, 303a,b,c of the valve plate assembly 54, the pressure therein has been effectively transformed to equilibrium with the tank (atmospheric) pressure.

From the above, it is noted that the pressure change within the piston chamber (e.g., piston 64, 264) is a function of the volume change that the piston chamber (e.g., piston 64, 264) undergoes as the piston passes through the trapped volume region $\Psi_t$ and $\Psi_b$. Naturally, the amount of trap distance required at TDC and BDC will be different for any given angle of the primary member 78 because the amount of fluid in the closed chamber 70 at TDC is less than the amount of fluid in the closed chamber 70 at BDC.

From the foregoing, it is readily apparent that the subject variable displacement axial piston pump 12, 212 provides smooth pressure transitions between the inlet port passage 50 and the outlet port passage 52 at both the TDC and BDC positions. By controlling the pressure transitions, the efficiency of the variable pump is increased and noise and vibration within the pump are reduced.

Other aspects, objects and advantages of the subject disclosure can be obtained from a study of the drawings, the disclosure and the appended claims. It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A variable displacement axial piston pump adapted for use in a fluid system, comprising:
 a housing having a body portion and a head portion with an inlet port passage and an outlet port passage;
 a rotating group disposed in the body portion and having an axis of rotation and including:
  a barrel having a plurality of cylinder bores,
  a plurality of piston assemblies with each of the plurality of piston assemblies having a piston slideably disposed within one of the cylinder bores, and
  a shoe pivotably attached to and extending from the piston, the rotating group being in fluid communication with the inlet and outlet port passages of the head portion;
 a valve plate assembly disposed between the head portion of the housing and the rotating group, the valve plate assembly comprising:
  a plurality of plates rotatably disposed adjacent each other and configured to control a flow of fluid between the rotating group and one or more of the inlet and outlet port passages of the head portion,
  wherein one or more of the plurality of plates comprises an arcuate slot configured to control the flow of fluid between the rotating group and one or more of the inlet and outlet port passages of the housing head portion, and the one or more plurality of plates comprise a first plate comprising a first arcuate slot, and a second plate comprising a second arcuate slot;
 a swashplate arrangement disposed in the body portion and being pivotable in a first arcuate direction relative to the axis of rotation of the rotating group and pivotable in a second arcuate direction relative to the axis of rotation of the rotating group; and
 a protrusion disposed adjacent the first arcuate slot of the first plate, the protrusion configured to nest with at least a portion of the second arcuate slot of the second plate.

2. The variable displacement axial piston pump of claim 1, in combination with a fluid system having a tank, fluid actuator, and a fluid control valve disposed between the fluid actuator and the variable displacement axial piston pump.

3. The variable displacement axial piston pump of claim 1, wherein each of the plurality of plates comprises an arcuate slot configured to control a flow of fluid between the rotating group and one or more of the inlet and outlet port passages of the head portion.

4. The variable displacement axial piston pump of claim 1, wherein an alignment of each of the arcuate slots of the plurality of plates relative to each other defines the flow of fluid between the rotating group and one or more of the inlet and outlet port passages of the housing head portion.

5. The variable displacement axial piston pump of claim 1, wherein the swashplate arrangement comprises a primary member disposed in the body portion and pivotable in the first arcuate direction relative to the axis of rotation of the rotating group and a secondary member disposed within the primary member that pivots in the second arcuate direction relative to the primary member.

6. The variable displacement axial piston pump of claim 5, wherein the pivot direction of the primary member is at an angle about the axis of rotation of the rotating group with respect to the pivot direction of the secondary member.

7. The variable displacement axial piston pump of claim 5, including an actuating mechanism disposed between the primary member and the secondary member.

8. A method of operating an axial piston pump comprising a swashplate, a valve plate assembly comprising a plurality of plates, and a group of piston assemblies disposed between the swashplate and the valve plate assembly, the method comprising:
 adjusting a position of a swashplate arrangement in at least one direction to displace one or more of a top dead center and a bottom dead center of the group of piston assemblies;
 slideably rotating one or more of the plurality of plates of the valve plate assembly relative to another plate of the plurality of plates to control the compression or decompression of an amount of trapped fluid volume effected by the valve plate assembly; and
 rotating the group of piston assemblies,
 wherein one or more of the plurality of plates comprises:
  an arcuate slot configured to control a flow of fluid between the group of piston assemblies and one or more of the inlet port passage and the outlet port passage, and
  a protrusion disposed adjacent the arcuate slot and configured to nest with at least a portion of an arcuate slot of another one of the plurality of plates.

* * * * *